(12) United States Patent
Yamamoto et al.

(10) Patent No.: US 7,324,047 B2
(45) Date of Patent: Jan. 29, 2008

(54) ADAPTIVE ANTENNA APPARATUS FOR SELECTING ADAPTIVE CONTROL PROCESSING ACCORDING TO DETECTED SIGNAL QUALITY AND RADIO COMMUNICATION APPARATUS USING THE SAME

(75) Inventors: Atsushi Yamamoto, Kyoto (JP); Koichi Ogawa, Osaka (JP); Hiroshi Iwai, Osaka (JP); Yoshio Koyanagi, Kanagawa (JP); Akira Kato, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 11/401,267

(22) Filed: Apr. 11, 2006

(65) Prior Publication Data

US 2006/0246953 A1    Nov. 2, 2006

(30) Foreign Application Priority Data

Apr. 13, 2005   (JP)   ............................ P2005-115393

(51) Int. Cl.
*H01Q 3/28* (2006.01)
*H01Q 3/30* (2006.01)
(52) U.S. Cl. ..................... 342/372; 342/374; 342/383
(58) Field of Classification Search ................ 342/368, 342/372, 374, 383; 455/101, 562.1
See application file for complete search history.

(56) References Cited

U.S. PATENT DOCUMENTS 4,977,616 A    12/1990  Linder et al.
6,678,508 B1    1/2004  Koilpillai et al.
6,757,267 B1*   6/2004  Evans et al. ................. 370/334
6,961,026 B2   11/2005  Toda
2005/0009586 A1  1/2005  Mori

FOREIGN PATENT DOCUMENTS

| JP | 01-189248 | 7/1989 |
| JP | 05-300129 | 11/1993 |
| JP | 2003-87051 | 3/2003 |
| JP | 2003-142919 | 5/2003 |
| JP | 2003-523126 | 7/2003 |
| JP | 2004-64743 | 2/2004 |
| JP | 2005-033410 | 2/2005 |

* cited by examiner

*Primary Examiner*—Dao Phan
(74) *Attorney, Agent, or Firm*—Wenderoth, Lind & Ponack, L.L.P.

(57) ABSTRACT

An adaptive antenna apparatus includes two antenna elements and a parasitic element to which a variable reactance element is connected, and selects an adaptive control process according to detected signal quality. A controller executes a first adaptive control process for adaptively controlling respective signals received by the respective antenna elements and outputting the respective signals after the adaptive control as a combined received signal, and executes a second adaptive control process for reactance controlling an element value of the variable reactance element. The controller executes the first adaptive control process. The controller executes a communication process when the detected signal quality is equal to or larger than a predetermined threshold. The controller executes the second adaptive control process when the detected signal quality is not equal to or larger than the threshold.

21 Claims, 23 Drawing Sheets

FIRST PREFERRED EMBODIMENT

FIRST PREFERRED EMBODIMENT

FIRST PREFERRED EMBODIMENT

SECOND PREFERRED EMBODIMENT

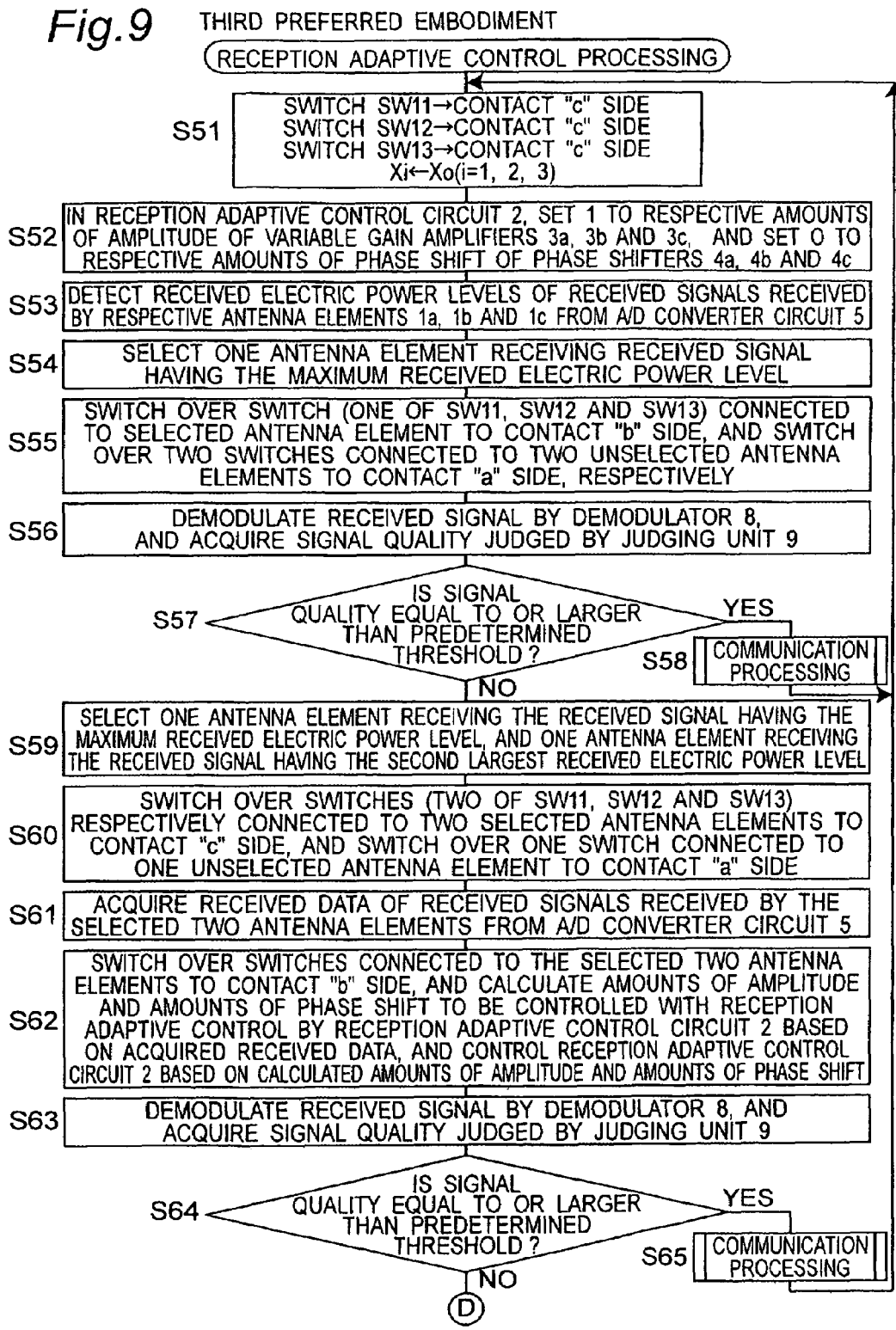

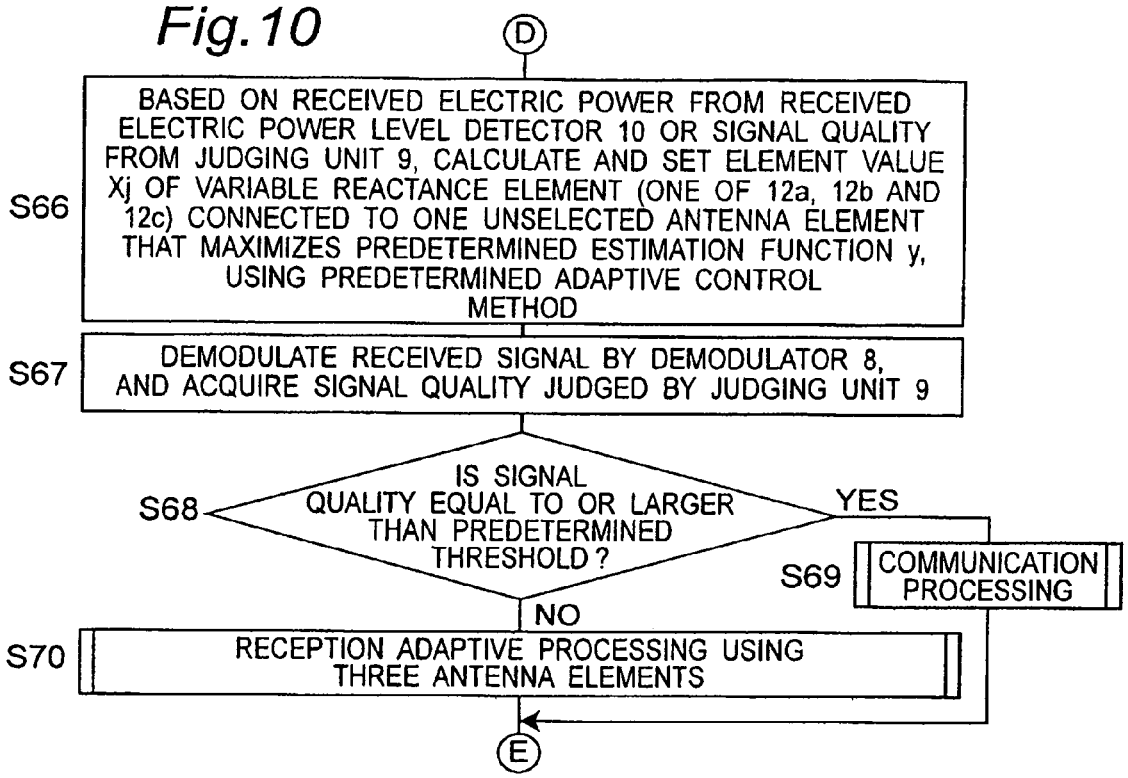
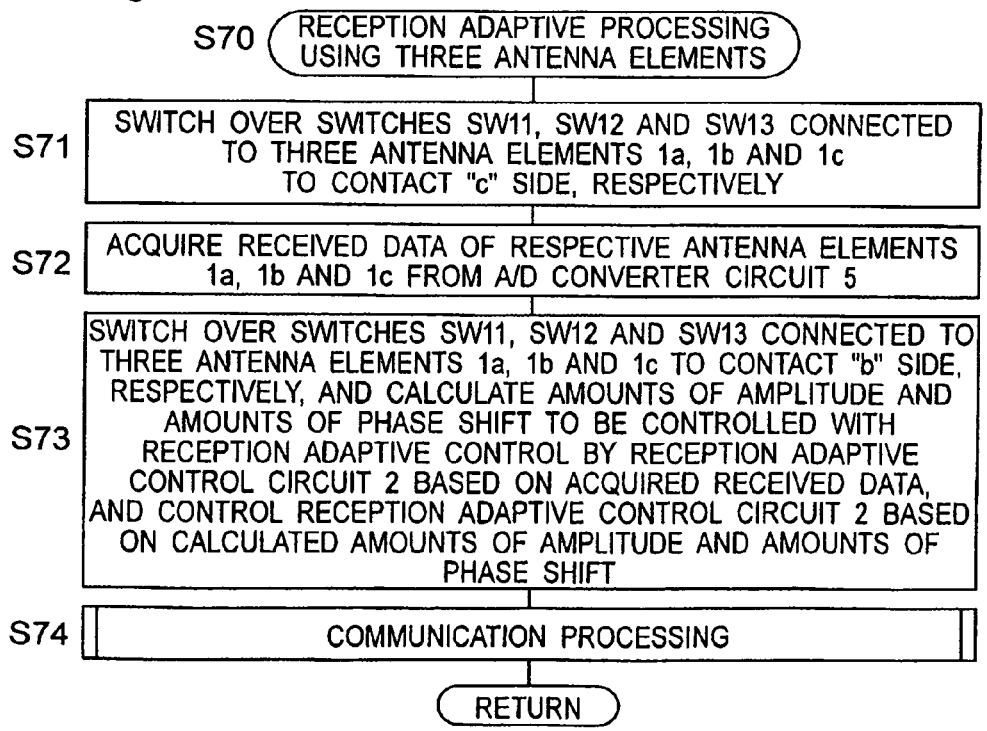

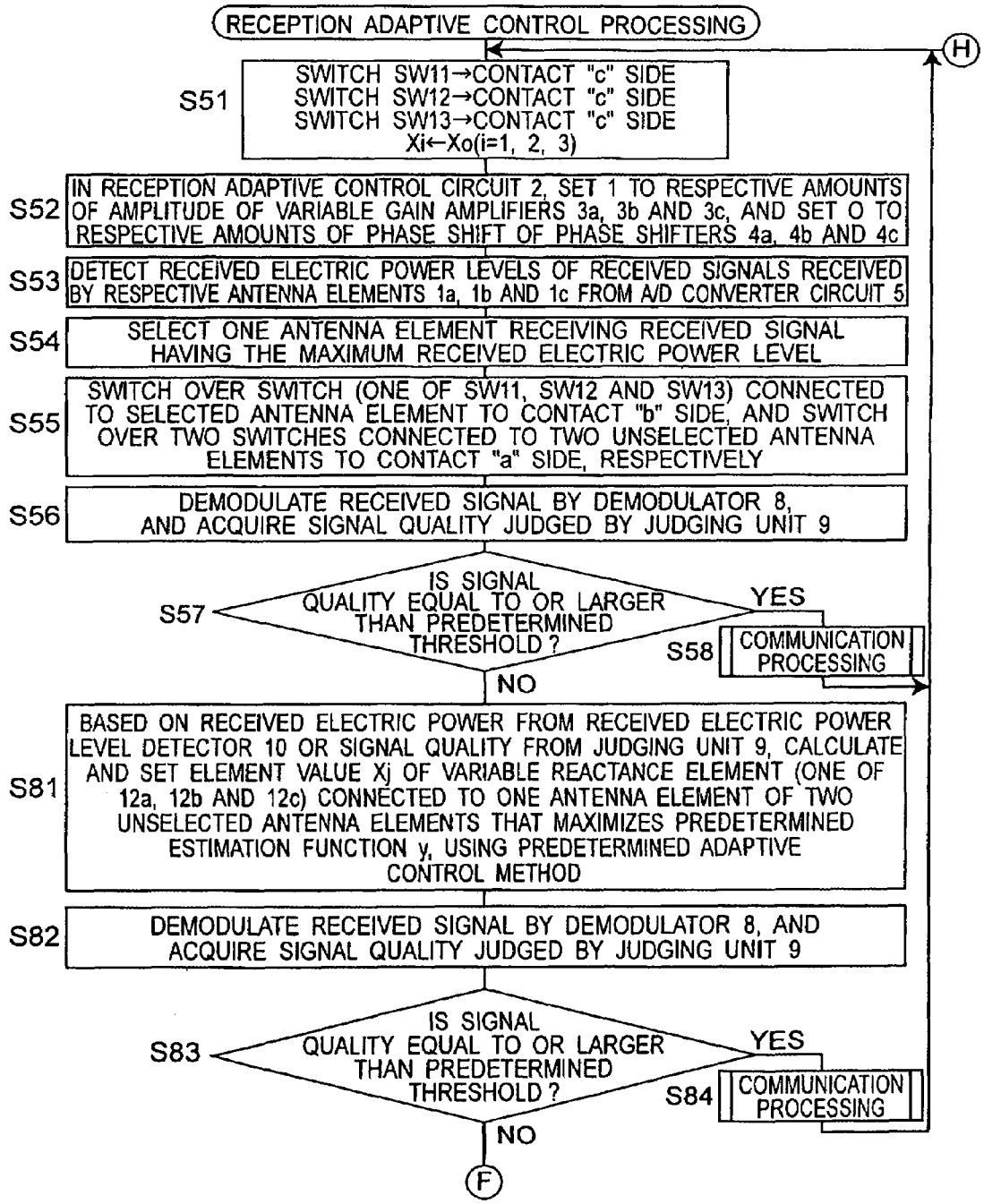

Fig. 15 SECOND MODIFIED PREFERED EMBODIMENT OF THIRD PREFERRED EMBODIMENT (RECEPTION ADAPTIVE CONTROL PROCESSING)

FOURTH PREFERRED EMBODIMENT

SIXTH PREFERRED EMBODIMENT

ADAPTIVE ANTENNA APPARATUS FOR SELECTING ADAPTIVE CONTROL PROCESSING ACCORDING TO DETECTED SIGNAL QUALITY AND RADIO COMMUNICATION APPARATUS USING THE SAME

BACKGROUND OF THE INVENTION

1. Field of the Invention

The present invention relates to an adaptive antenna apparatus that selects adaptive control processes according to a detected signal quality. In particular, the present invention relates to an adaptive antenna apparatus for receiving a radio signal with adaptive control using a plurality of antenna elements, which is provided to keep favorable communication quality, for example, in a portable radio communication apparatus of a mobile communication system or the like. The present invention also relates to a radio communication apparatus using the same adaptive antenna apparatus.

2. Description of the Related Art

An example of an apparatus for controlling an array antenna provided with an adaptive antenna apparatus according to a first prior art example is disclosed in Japanese Patent Laid-open Publication No. JP-2003-087051-A (referred to as a Patent Document 1 hereinafter). The apparatus for controlling the array antenna has the following configuration in order to perform adaptive control without giving the arrival angle of the received signal in advance, such that a main beam is directed to a desired wave, and nulls are directed to interference waves. The adaptive controller is provided to adaptively control an array antenna, which is an ESPER antenna including one radiating element and six parasitic elements. In this case, the adaptive controller executes adaptive control process based on the circular station of a spectrum according to a received signal y(n) upon receiving a learning sequence signal included in a radio signal transmitted from a destination transmitter by the radiating element of the array antenna, and a learning sequence signal d(n) which is identical to the transmitted learning sequence signal and generated by a learning sequence signal generator. Doing so, allows the adaptive controller to calculate and set reactance values $x_m$ of respective variable reactance elements for directing the main beam of the array antenna in the directions of the desired waves, and for directing the nulls in the directions of the interference waves.

Moreover, in an adaptive antenna apparatus according to a second prior art example disclosed in Japanese Patent Laid-open Publication JP-2004-064743-A (referred to as a Patent Document 2 hereinafter), an adaptive antenna apparatus arranged with a plurality of array branches includes the following components in order to achieve downsizing and lower electric power consumption:

A plurality of radiating antenna elements arranged so that spatial correlations therebetween become smaller, that is, at an interval "d" of d>>λ, where λ denotes a wavelength of a radio signal.

A plurality of parasitic antenna elements arranged so that spatial correlations to these respective radiating antenna elements become larger relatively, that is, at an interval "d" of d<λ/2.

Variable reactance elements that terminate these parasitic antenna elements.

A reactance controller for controlling the variable reactance elements based on received signals received by the radiating antenna elements.

A weighting controller that weights the received signals received by the plurality of antenna elements by means of respective weighting circuits, combines the weighted received signals by means of a combining circuit, and controls the weighting circuits such that a signal-to-interference and noise ratio S/(I+N) of a combined output signal becomes the maximum.

However, the adaptive antenna apparatus according to the first prior art example has the following problems. In the first prior art example, since the directivity is controlled by the one antenna element and the plurality of parasitic elements, it is necessary for the antenna element and the parasitic elements to be optimally arranged. Thus, the size and shape of the array antenna apparatus are limited. In the case of the first prior art example, the size of the array antenna apparatus is required to have a diameter of ½ wavelength and a height of ¼ wavelength. In other words, the wavelengths are 0.33 m and 0.15 m in the 900 MHz band and the 2 GHz band, respectively, which are radio frequency bands used by current portable telephones, and are longer than the size of each portable telephone. Therefore, the antenna size of the first prior art example is larger than the size of the portable telephone, and thus, the array antenna apparatus cannot be used as it is in the portable telephones. Also, there are such problems that the control over the directivity is limited and that the control algorithm becomes complicated.

Moreover, in the adaptive antenna apparatus according to the second prior art example, since the plurality of ESPER antennas are co-allocated and the reactance control and the weighing control for adaptive control are used in combination, there are more problems in that the size of the apparatus configuration becomes larger and in that the control process becomes complicated.

SUMMARY OF THE INVENTION

It is an object of the present invention to solve the above-described problems, and to provide an adaptive antenna apparatus and a radio communication apparatus capable of sufficiently suppressing interference waves with a smaller number of antenna elements even in a relatively low frequency band used in a mobile radio system, for example.

According to the first aspect of the present invention, there is provided an adaptive antenna apparatus that includes a plurality of antenna elements, at least one parasitic element to which a variable reactance element is connected, an adaptive controller, a reactance controller, a signal quality detector and an apparatus controller. The adaptive controller executes a first adaptive control process for adaptively controlling respective received signals received by the plurality of antenna elements. Moreover, the adaptive controller outputs the respective received signals after the adaptive control as a combined received signal. The reactance controller executes a second adaptive control process for reactance controlling an element value of the variable reactance element connected to the parasitic element. The signal quality detector detects signal quality of the combined received signal. The apparatus controller executes one of the first adaptive control process and the second adaptive control process. The apparatus controller executes a predetermined communication process when the detected signal quality is equal to or larger than a predetermined threshold.

The apparatus controller executes the other adaptive control process when the detected signal quality is not equal to or larger than the threshold.

The above-mentioned adaptive antenna apparatus further includes a receiver. The receiver separates the variable reactance element from the parasitic element and receives a signal received by the parasitic element when no radio signal is received by the plurality of antenna elements.

In addition, the apparatus controller executes the first adaptive control process. The apparatus controller executes the communication process when the detected signal quality is equal to or larger than the predetermined threshold. The apparatus controller executes the second adaptive control process when the detected signal quality is not equal to or larger than the predetermined threshold.

Further, the apparatus controller executes the second adaptive control process. The apparatus controller executes the communication process when the detected signal quality is equal to or larger than the predetermined threshold. The apparatus controller executes the first adaptive control process when the detected signal quality is not equal to or larger than the predetermined threshold.

Still further, the second adaptive control process includes adaptive control processes using a plurality of adaptive control methods different from each other. The apparatus controller selects and executes one of the adaptive control processes using the plurality of adaptive control methods based on maximum received electric powers of the respective signals received by the respective antenna elements.

In this case, the second adaptive control process includes: (1) using a first adaptive control method of controlling the element value of the variable reactance element so that an estimation function including a signal-to-noise ratio becomes the maximum or minimum; (2) using a second adaptive control method of controlling the element value of the variable reactance element so that an estimation function including a bit error rate becomes maximum or minimum; and (3) using a third adaptive control method of controlling the element value of the variable reactance element so that an estimation function including the signal-to-noise ratio and the bit error rate becomes maximum or minimum. The apparatus controller executes the second adaptive control process using the first adaptive control method when the maximum received electric power is smaller than a predetermined first threshold. The apparatus controller executes the second adaptive control process using the second adaptive control method when the maximum received electric power is equal to or larger than the first threshold and is smaller than a predetermined second threshold that is larger than the first threshold. The apparatus controller executes the second adaptive control process using the third adaptive control method when the maximum received electric power is equal to or larger than the second threshold.

According to the second aspect of the present invention, there is provided an adaptive antenna apparatus including a plurality of antenna elements and a plurality of variable reactance elements provided so as to correspond to at least one part of the plurality of antenna elements. The adaptive antenna apparatus also includes a plurality of reception adaptive controllers provided so as to correspond to at least one part of the plurality of antenna elements, a switching device, an adaptive controller, a reactance controller, a signal quality detector, a signal level detector, and an apparatus controller. The switching device switches over the antenna elements so as to selectively connect each of the antenna elements to one of the corresponding variable reactance elements and the corresponding reception adaptive controller. The adaptive controller executes a first adaptive control process for adaptively controlling respective signals received by at least one part of the plurality of antenna elements via the switching device. Moreover, the adaptive controller outputs the respective received signals after the adaptive control as a combined received signal. The reactance controller executes a second adaptive control process for reactance controlling element values of the respective reactance elements connected to at least one part of the plurality of antennal elements via the switching device. The signal quality detector detects signal quality of the combined received signal. The signal level detector detects signal levels of the respective received signals received by the respective antenna elements. The apparatus controller executes the first adaptive control process using one part of the plurality of antenna elements based on the detected signal levels of the respective received signals. The apparatus controller executes a predetermined communication process when the detected signal quality is equal to or larger than a predetermined threshold. The apparatus controller executes the second adaptive control process using the antenna element other than the antenna element used by the first adaptive control process when the detected signal quality is not equal to or larger than the predetermined threshold.

In the above-mentioned adaptive antenna apparatus, at a first step, the apparatus controller makes the signal quality detector detect signal quality of a received signal having the maximum signal level among the detected signal levels of the respective received signals. The apparatus controller executes the communication process when the detected signal quality is equal to or larger than the threshold. At a second step, when the detected signal quality is not equal to or larger than the threshold, the apparatus controller makes the signal quality detector detect signal quality of a combined received signal of the received signal having the maximum signal level and the received signal having the second-largest signal level among the detected signal levels of the respective received signals. The apparatus controller executes the communication process when the detected signal quality is equal to or larger than the threshold.

In addition, in the above-mentioned adaptive antenna apparatus, prior to the second step, the apparatus controller executes the second adaptive control process by the reactance controller using at least one antenna element other than the antenna element that has received the received signal having the maximum signal level. The apparatus controller executes the communication process when the detected signal quality is equal to or larger than the threshold. The apparatus controller executes the second step when the detected signal quality is not equal to or larger than the threshold.

Further, at a first step, the apparatus controller makes the signal quality detector detect signal quality of a received signal having the maximum signal quality among the detected signal qualities of the respective received signals. The apparatus controller executes the communication process when the detected signal quality is equal to or larger than the threshold. At a second step, when the detected signal quality is not equal to or larger than the threshold, the apparatus controller makes the signal quality detector detect signal quality of a combined received signal of the received signal having the maximum signal quality and the received signal having the second-largest signal quality among the detected signal qualities of the respective received signals.

The apparatus controller executes the communication process when the detected signal quality is equal to or larger than the threshold.

Still further, in the above-mentioned adaptive antenna apparatus, prior to the second step, the apparatus controller executes the second adaptive control process by the reactance controller using at least one antenna element other than the antenna element that has received the received signal having the maximum signal quality. The apparatus controller executes the communication process when the detected signal quality is equal to or larger than the threshold. The apparatus controller executes the second step when the detected signal quality is not equal to or larger than the threshold.

In addition, at a third step after the second step, the apparatus controller executes the second adaptive control process by the reactance controller using at least one remaining antenna element with which the second adaptive control process has not been executed, other than the antenna element that received the received signal having the maximum signal quality. The apparatus controller executes the communication process when the detected signal quality is equal to or larger than the threshold.

Further, after the third step, the apparatus controller executes the first adaptive control process using the plurality of antenna elements connected to the plurality of adaptive controllers when the signal quality detected at the third step is not equal to or larger than the threshold.

According to the third aspect of the present invention, there is provided a radio communication apparatus that includes an adaptive antenna apparatus and a radio receiver circuit that receives a received signal received by the adaptive antenna apparatus.

Accordingly, in the adaptive antenna apparatus and the radio communication apparatus using the same according to the present invention, the control is performed such that one of the first adaptive control process and the second adaptive control process is executed. When the detected signal quality is equal to or larger than a predetermined threshold, a predetermined communication process is executed, while when the detected signal quality is not equal to or larger than the threshold, the other adaptive control process is executed. Alternatively, the control is performed such that based on the detected signal levels of the respective received signals, the first adaptive control process is executed using one part of the plurality of antenna elements. When the detected signal quality is equal to or larger than the threshold, the predetermined communication process is executed, while when the detected signal quality is not equal to or larger than the predetermined threshold, the second adaptive control process is executed using the antenna element other than the antenna element used by the first adaptive control process. Therefore, for example, even in a relatively low frequency band used in a mobile radio system, interference waves can be suppressed with a smaller number of antenna elements, and a radio signal having the best signal quality can always be received.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 9 is a flowchart showing a first part of a reception adaptive control process according to the fifth embodiment, which is executed by a controller 6 of the adaptive antenna apparatus of FIG. 8;

FIG. 10 is a flowchart showing a second part of the reception adaptive control process according to the fifth embodiment;

FIG. 11 is a flowchart showing a reception adaptive process using three antenna elements, which is a subroutine of FIG. 10;

FIG. 12 is a flowchart showing a first part of a reception adaptive control process according to a sixth embodiment, which is executed by the controller 6 of the adaptive antenna apparatus of FIG. 8;

DETAILED DESCRIPTION OF THE INVENTION

Figure 1:
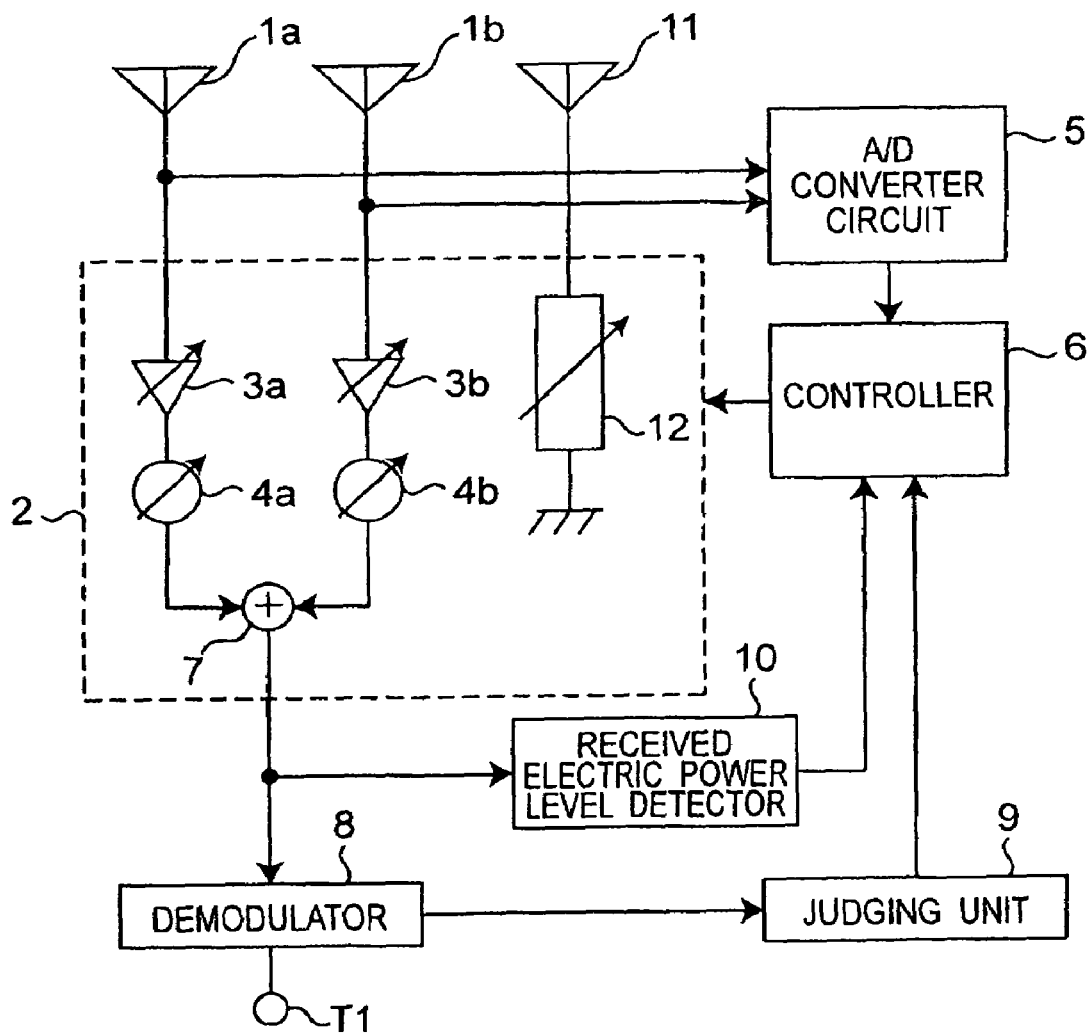
FIG. 1 is a block diagram showing a configuration of an adaptive antenna apparatus according to a first embodiment of the present invention.

The preferred embodiments according to the present invention will be described below with reference to the attached drawings. In the drawings, the same reference numerals denote similar components or the like.

First Preferred Embodiment

FIG. 1 is a block diagram showing a configuration of an adaptive antenna apparatus according to a first embodiment of the present invention. Referring to FIG. 1, the adaptive antenna apparatus is provided in a radio communication apparatus and executes a process for radio communication with larger signal quality by performing adaptive control on received radio signals. The adaptive antenna apparatus includes two antenna elements 1a and 1b each of a radiating element, one parasitic element 11, a reception adaptive control circuit 2, an analog-to-digital converter circuit 5 (hereinafter, an analog-to-digital converter is referred to as an A/D converter), a controller 6, a signal combiner 7, a demodulator 8, a judging unit 9, a received electric power level detector 10, and an output terminal T1. An interval "d" between the two antenna elements 1a and 1b is preferably set to be in a range from $\lambda/4$ to $\lambda/2$, and more preferably, set to $\lambda/2$. Furthermore, an interval "d" between each of the two antenna elements 1a and 1b, and parasitic element 11 is preferably set to be in a range from $\lambda/8$ to $\lambda/2$, and more preferably, set to $\lambda/4$ or $\lambda/2$.

Referring to FIG. 1, the respective radio signals received by the antenna elements 1a and 1b are inputted to the A/D converter circuit 5 and the reception adaptive control circuit 2. The A/D converter circuit 5 includes A/D converters corresponding to the respective antenna elements 1a and 1b. The respective A/D converters converts the respective radio signals received by the antenna elements 1a and 1b into digital signals, and outputs the digital signals to the controller 6.

The reception adaptive control circuit 2 includes two variable gain amplifiers 3a and 3b, two phase shifters 4a and 4b, the signal combiner 7 is an adder for combining electric power of the two inputted radio signals, and a variable reactance element 12. Variable amplitude amounts of the two variable gain amplifiers 3a and 3b, phase shift amounts of the two phase shifters 4a and 4b, and a reactance value of the variable reactance element 12 are controlled by the controller 6. The radio signal received by the antenna element 1a is outputted to the signal combiner 7 via the variable gain amplifier 3a and the phase shifter 4a. The radio signal received by the antenna element 1b is outputted to the signal combiner 7 via the variable gain amplifier 3b and the phase shifter 4b. The signal combiner 7 combines the two inputted radio signals by adding the signals. The combined radio signal is outputted to the demodulator 8 and the received electric power level detector 10. The received electric power level detector 10 detects a received electric power level of the inputted combined radio signal, and outputs a signal indicating the detected received electric power level to the controller 6. Furthermore, the radio signal received by the parasitic element 11 is terminated by the variable reactance element 12 one end of which is grounded.

The demodulator 8 demodulates the radio signal inputted from the signal combiner 7 into a baseband signal, which is a demodulated signal, by using a predetermined digital demodulating method, and outputs the baseband signal to the output terminal T1 and the judging unit 9. The judging unit 9 measures a bit error rate based on a reference pattern for a reference pattern interval in advance contained in the inputted baseband signal, and outputs the results thereof to the controller 6. The controller 6 controls the variable amplitude amounts of the two variable gain amplifiers 3a and 3b, the phase shift amounts of the two phase shifters 4a and 4b, and the reactance value of the variable reactance element 12 of the reception adaptive control circuit 2, so that a radio signal having the best signal quality is received and demodulated. It should be noted that, although there are included a high frequency filter for separating frequency components, a high frequency amplifier for amplifying a radio signal, a high frequency circuit such as a mixer for converting the radio signal to an intermediate frequency signal having a predetermined intermediate frequency, an intermediate frequency circuit, a signal process circuit, and the like, they are omitted in FIG. 1. Namely, in the reception adaptive control circuit 2, the process may be executed with a carrier wave frequency or may be executed with an intermediate frequency after frequency conversion to an intermediate frequency signal. Furthermore, in the reception adaptive control circuit 2, the order of signal process of the respective variable gain amplifiers 3a and 3b and the respective phase shifters 4a and 4b is not limited to that of FIG. 1, however, they may be reversed.

An adaptive control method of the adaptive antenna apparatus is described below. The adaptive antenna apparatus employs an adaptive control technique which maximizes a radiation pattern of the antenna in the direction of desired radio wave (namely, a main beam of the radiation pattern of the antenna is directed substantially in the direction of the desired wave), and directs nulls of the radiation pattern of the antenna in the directions of interference waves of disturbances (that is, the nulls of the radiation pattern of the antenna are directed substantially in the directions of the interference waves), to realize stable radio communication. Normally, in the adaptive antenna apparatus, as shown in FIG. 1, the antenna elements 1a and 1b include the variable gain amplifiers 3a and 3b, respectively, which are amplitude adjusting circuits, and include the phase shifters 4a and 4b, respectively. The above control is performed so as to realize the maximum desired signal electric power and the minimum interference signal electric power by giving an amplitude difference and a phase difference to the radio signals received by the respective antenna elements 1a and 1b (or intermediate frequency signals obtained by frequency conversion on the radio signals).

In the radio signals received by the respective antenna elements 1a and 1b, thermal noise components are received together with a desired wave signal. Also, in some cases, the co-channel interference wave of the same frequency from an adjacent base station and a delayed wave, which is a desired wave but is delayed due to arrival via a long path, are received. The delayed wave deteriorates the quality of screen display, for example, as a ghost displayed on a television receiver, in an analog radio communication system of television broadcasting, radio broadcasting or the like. On the other hand, in a digital radio communication system, the thermal noise, the co-channel interference wave and the delayed wave influence the system as bit errors, resulting in a direct deterioration in signal quality. In this case, when the desired wave electric power is denoted by C, the thermal noise electric power is denoted by N, and the interference wave electric power including the co-channel interference wave and the delayed wave is denoted by I, the adaptive antenna apparatus preferably performs adaptive control such that C/(N+I) is maximized, in order to improve the signal quality.

Next, more specifically, adaptive control operation of the adaptive antenna apparatus is described below with reference to FIG. 1.

The radio signals received by the respective antenna elements 1a and 1b are converted by the A/D converter circuit 5 into a digital signal x(t) (which is a signal vector having four elements in the first embodiment), which is inputted to the controller 6. The controller 6 determines the amplitude amount of each of the variable gain amplifiers 3a and 3b and the phase shift amount of each of the phase shifters 4a and 4b so that signal quality of a radio signal y(t) outputted from the reception adaptive control circuit 2 becomes the best. Hereinafter, a method for calculating a weighting coefficient including the amplitude amount and phase shift amount is described. Weighting coefficients Wi are defined by the following equation using the amplitude amount Ai and the phase shift amount φi:

$$Wi = Ai \cdot \exp(j \cdot \phi i) \tag{1},$$

where j denotes an imaginary unit, and i takes a value of 1 or 2, each of which corresponds to a system that processes the radio signal received by each of the antenna elements 1a and 1b. A weighting coefficient vector W having elements of the weighting coefficients Wi is defined, and hereinafter, a method of obtaining the weighting coefficients Wi is described.

Although there are several methods for obtaining the weighting coefficients Wi, in this case, an example using steepest descent method (Least Means Squares (LMS)) is described. In this technique, the adaptive antenna apparatus stores a reference signal r(t) in advance, which is a signal series included in a known desired wave, and controls the received radio signal so that the signal series included in the received radio signal is close to the reference signal. In this case, an example in which the reference signal r(t) is stored in the controller 6 in advance is shown. More specifically, the controller 6 controls the reception adaptive control circuit 2 so that the radio digital signal x(t) is multiplied by a weighting coefficient w(t) having components of the amplitude amount and phase shift amount. A residual error e(t) between the multiplication result obtained by multiplying the radio digital signal x(t) by the weighting coefficient w(t) and the reference signal r(t) is given by the following equation:

$$e(t) = r(t) - w(t) \times x(t) \tag{2},$$

where the residual error e(t) takes a positive value or a negative value. Accordingly, the minimum value of a value obtained by squaring the residual error e(t) given by the equation (2) is recurrently obtained by repeated calculations. Namely, a weighting efficient w(t, m+1) obtained by the repeated calculation a plurality of (m+1) times is given by the following equation using a weighting coefficient w(t, m) at the m-th time:

$$w(t, m+1) = w(t, m) + u \times x(t) \times e(t, m) \tag{3},$$

where "u" is referred to as a step size. There is an advantage that when the step size "u" is large, the number of repeated calculations by which the weighting coefficient "w" converges to the minimum value becomes smaller. However, when the step size "u" is too large, there is a disadvantage that the weighting coefficient "w" vibrates around the minimum value. Accordingly, it is necessary to pay attention to the selection of the step size "u", depending on the system. On the contrary, the weighting coefficient "w" is stabilized and converges to the minimum value by setting the step size "u" to be small. However, the number of repeated calculations increases. When the number of repeated calculations increases, it takes a long time to obtain the weighting coefficient. When the calculation time of the weighting coefficient "w" is smaller than the change time of the circumferential environment (e.g. several milliseconds), the signal quality by this weighting coefficient "w" cannot be improved. Therefore, when the step size "u" is determined as the fastest and stablest condition of convergence possible should be selected. Furthermore, the residual error e(t, m) is defined by the following equation:

$$e(t, m) = r(t) - w(t, m) \times x(t) \tag{4}.$$

The equation (3) is recurrently updated using the value of the equation (4). It should be noted that the maximum number of repeated calculations for obtaining the weighting coefficient "w" is set so that the weighting coefficient calculation time is not smaller than the switching time of the radio system.

In this case, the judging method for the adaptive control of the radio communication system based on the steepest descent method is described as one example. However, the present invention is not limited to this. For example, an RLS (Recursive Least-Squares) method, or an SMI (Sample Matrix Inversion) method capable of faster judgment may also be employed. While these methods make the judgment faster, the calculation by the judging unit 9 is more complicated. Furthermore, in the case where a modulation method of the signal series is a low envelope modulation, which has a constant envelope such as digital phase modulation, CMA (Constant Modulus Algorithm) can also be used.

Next, various adaptive control methods that can be used in the present preferred embodiment are described below. In this case, the following three adaptive control methods are described.

In a first adaptive control method, the control is performed such that an estimation function "y" defined by the following equation becomes the maximum, so that the received electric power becomes larger:

$$y = a \cdot SNR \tag{5}.$$

In the equation (5), SNR denotes a ratio of received electric power to thermal noise. Furthermore, "a" denotes a predetermined coefficient, and is set so that the estimation function "y" has such a magnitude to facilitate the estimation. In this case, since the SNR in a communicable state is a positive real number in the normal radio communication system, the estimation function value "y" can be a positive real number by setting the coefficient "a" to a positive real number.

Furthermore, as a method for maximizing the estimation function value "y", for example, a perturbation method has been known publicly. It is supposed that an estimation function at a timing (n−1)T is denoted by y((n−1)T), and that an estimation function at a timing (nT) after the reactance value is changed by ΔX((n−1)T) is denoted by y(nT). In this case, "n" denotes an integral number of a time parameter from an initial value of 1 to the maximum number N of perturbations, and T denotes a time required for the perturbation (perturbation period or cycle). Thus, y(0) denotes an estimation value before the perturbation of the reactance value. As one example, the estimation function y(nT) at the timing (nT) is expressed by the following equation:

$$y(nT)=a \cdot SNR(nT) \qquad (6).$$

When a difference y(nT)−y((n−1)T) in the perturbation amount is positive, a perturbation amount ΔX(nT) of the reactance value to be changed next, is changed in a manner similar to that of a prior perturbation amount ΔX((n−1)T). For example, in the case where the perturbation amount ΔX((n−1)T) is positive and the reactance value increases, the perturbation amount ΔX(nT) is also positive and the reactance value increases. On the contrary, in the case where the perturbation amount ΔX((n−1)T) is negative and the reactance value decreases, the perturbation amount ΔX(nT) is also negative, and the reactance value decreases. Furthermore, when the difference y(nT)−y((n−1)T) in the perturbation amount is negative, the perturbation amount ΔX(nT) is changed in a reversed direction to that of the perturbation amount ΔX((n−1)T). For example, in the case where the perturbation amount ΔX((n−1)T) is positive and the reactance value increases, the perturbation amount ΔX(nT) is negative and the reactance value decreases. On the contrary, in the case where the perturbation amount ΔX((n−1)T) is negative and the reactance value decreases, the perturbation amount ΔX(nT) is positive, and the reactance value increases. The repetition of this process allows the estimation function "y" to be maximized.

Moreover, by setting amplitude values (absolute values) of the respective perturbation amounts |ΔX(nT)| to be the same as each other, the simplification of the control can be achieved. On the other hand, by reducing the amplitude (absolute value) of the perturbation amount |ΔX(nT)| as the number of perturbations increases, finer reactance values can be obtained and high precision control can be achieved. One example of method for reducing the amplitude of the perturbation amount is shown. In the following equation, "c" and "d" denote predetermined positive real constant numbers:

$$|\Delta X(nT)|=c/n \qquad (7), \text{ and}$$

$$|\Delta X(nT)|=a \cdot \exp(-d \cdot n) \qquad (8).$$

Furthermore, in the case where the time parameter "n" is changed from 1, when the sign of the difference y(nT)−y((n−1)T) of the perturbation amount changes, the perturbation stops, and a reactance value X is set to X=j(X0+ΔX((n−1)T)). In this case, $X_0$ denotes an initial value of the reactance value. Thus, the speeding up can be achieved by avoiding performing the maximum number N of time of perturbations.

Moreover, since the received electric power has a large variation range, RSSI (Received Signal Strength Indicator) or the like is often obtained decibels. Accordingly, by expressing the above-mentioned equation (5) by the following equation in decibels, the foregoing can be avoided:

$$y=a \cdot 10 \cdot \log_{10}(SNR) \qquad (9).$$

Next, a second adaptive control method is described below. In the relevant second adaptive control method, the control is performed such that the estimation function "y" defined by the following equation is maximized in order to reduce a bit error rate BER:

$$y=b/(BER) \qquad (10),$$

In the above-mentioned the equation (10), "b" is a predetermined coefficient, and is set so that the estimation function "y" has such a magnitude to facilitate the estimation. In this case, since the error rate BER is a positive real number, the estimation function value "y" is allowed to be a positive real number by setting the coefficient "b" to a positive real number. Since the error rate BER decreases as the communication quality improves, it is preferable that the estimation function "y" take an inverse number of the error rate BER as expressed by the equation (10).

A method for maximizing the estimation function "y" is similar to that in the case of the received electric power of the first adaptive control method. Moreover, in some cases, the error rate BER is evaluated, for example, in a range from 0.5 to $10^{-6}$, which has a very large variation width. Accordingly, by expressing the above-mentioned equation (10) in decibels by the following equation, the variation width can also be narrowed:

$$y=b/\{10 \cdot \log_{10}(BER)\} \qquad (11).$$

Furthermore, a third adaptive control method is described below. In the third adaptive control method, the control is performed such that the estimation function "y" defined by the following equation is maximized in order to increase the received electric power and to reduce the bit error rate BER:

$$y=a \cdot SNR+b/BER \qquad (12).$$

In the above-mentioned equation (12), SNR denotes a ratio of received electric power to thermal noise. Moreover, "a" and "b" are predetermined weighting coefficients. The level of importance on SNR and BER can be determined by changing the ratio of coefficient "a" to coefficient "b". For example, upon considering that the received electric power is important, a/b is increased. On the other hand, upon considering the error rate BER is important, a/b is decreased. In this case, since SNR and BER are positive real numbers, respectively, the estimation function value "y" is allowed to be a positive real number by setting the coefficient "a" and the coefficient "b" to positive real numbers.

A method for maximizing the estimation function "y" is similar to that in the case of the received electric power of the first adaptive control method. Moreover, since the received electric power has a large variation range, RSSI or the like is often obtained in decibels. Furthermore, in some cases, the error rate BER is evaluated, for example, in a range from 0.5 to $10^{-6}$, which has a very large variation width. Accordingly, by expressing the above-mentioned equation (12) in decibels by the following equation, the variation width can also be narrowed:

$$y=a \cdot 10 \cdot \log_{10}(SNR)-b\{10 \cdot \log_{10}(BER)\} \qquad (13).$$

In the above-mentioned first to third adaptive control methods, the method for maximizing the estimation function value "y" is not limited to the perturbation method. The control of taking an inverse number of right side of each of the above-mentioned equations (5), (9), (10) and (11) to minimize the estimation function "y" is also possible. In this case, for the equations (12) and (13), the terms on the right side are inverted. Furthermore, as a method for selecting these first to third adaptive control methods, the selection is preferably made as follows:

(1) The first adaptive control method is selected in the case where the received electric power is very small, for example, where it is close to the minimum reception sensitivity, so that top priority is given to the received electric power to ensure the radio communication;

(2) The second adaptive control method is selected in the case where the received electric power has some margin; and (3) The third adaptive control method is selected at the time of normal data communication or telephone communication.

Furthermore, it is also possible to provide a predetermined threshold in the above-mentioned parameter for switching. The selection process by these first to third adaptive control methods will be described in detail with reference to FIG. 6.

Figure 2:
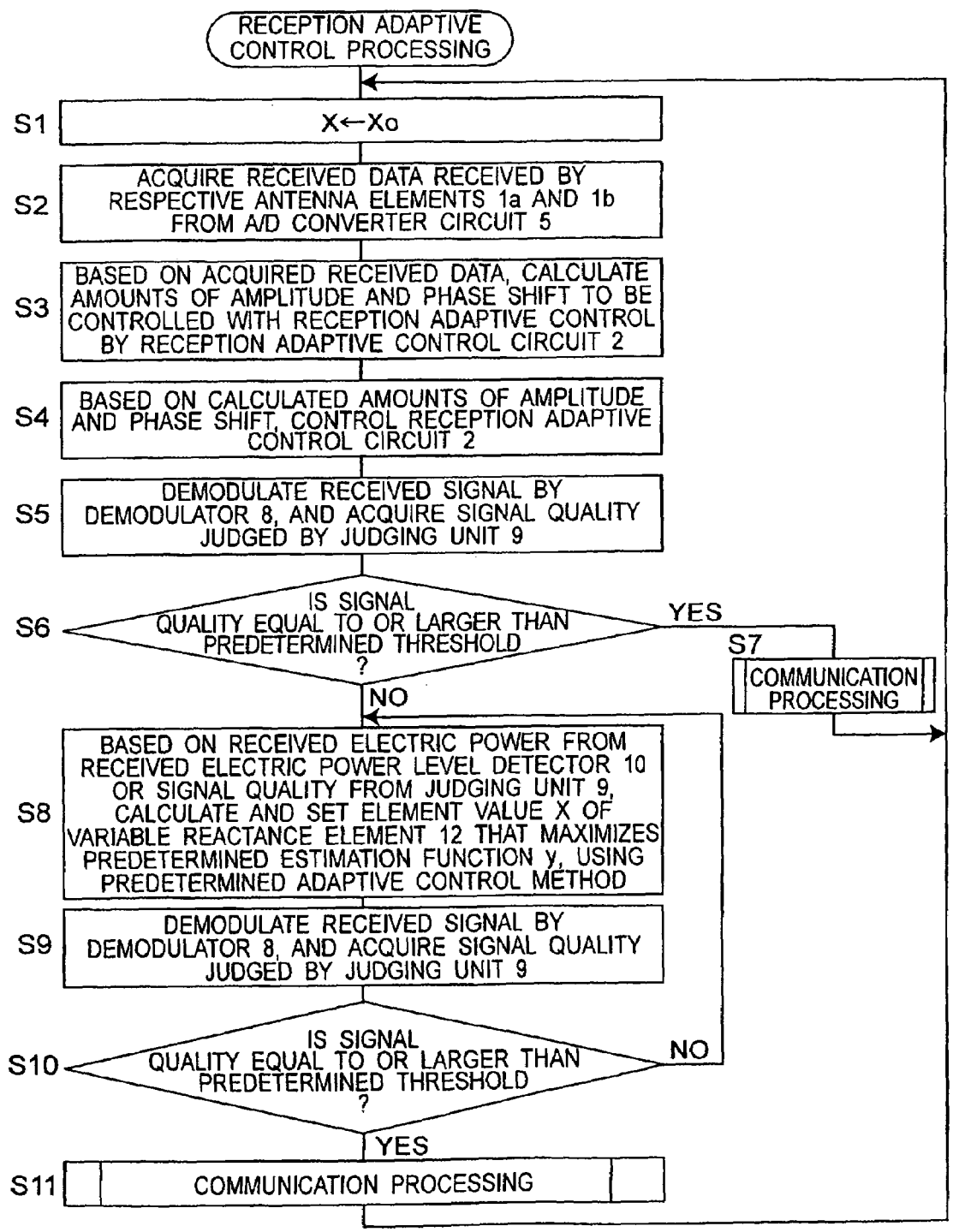
FIG. 2 is a flowchart showing a reception adaptive control process according to the first embodiment, which is executed by a controller 6 of the adaptive antenna apparatus of FIG. 1.

FIG. 2 is a flowchart showing a reception adaptive control process according to the first embodiment, which is executed by the controller 6 of the adaptive antenna apparatus of FIG. 1.

At step S1 of FIG. 2, the reactance value X of the variable reactance element 12 is set to the predetermined initial value $X_0$. In the case of a radio communication system primarily intended for telephone call, this setting of the initial value $X_0$ is preferably made so that a radiation characteristic of the antenna apparatus improves during the call (e.g. when a head comes close to the system). Moreover, in the case of a radio system primarily intended for data communication, the setting of the initial value $X_0$ is preferably made so that the radiation characteristic of the antenna apparatus improves when it is used for data communication (e.g. when it is held by a hand at a position anterior to the body or when it is in free space since it is away from the body). However, the present invention is not limited to this, but a predetermined value such as $X_0=0$ may be set. Next, at step S2, the data received by the respective antenna elements 1a and 1b is acquired from the A/D converter circuit 5. Then, at step S3, based on the acquired received data, the amplitude amount and phase shift amount to be controlled by the reception adaptive-control are calculated. Further, at step S4, based on the calculated amplitude amount and phase shift amount, the reception adaptive control circuit 2 is controlled. At step S5, the received signal is demodulated by the modulator 8, and signal quality judged by the judging unit 9 is acquired. Next, at step S6, the controller 6 judges whether or not the signal quality is equal to or larger than a predetermined threshold (for example, the error rate $BER>10^{-5}$, and hereinafter, this condition can be applied). If YES at step S6, the control flow proceeds to step S7. On the other hand, if NO at step S6, the control flow proceeds to step S8. At step S7, the communication process of the relevant radio communication apparatus is executed under adaptive control at step S4. The control flow returns to step S1.

At step S8, based on the received electric power from the received electric power level detector 10 or the signal quality from the judging unit 9, an element value X of the variable reactance element 12 that maximizes the predetermined estimation function "y" is calculated and set by using the predetermined adaptive control method. In this case, the adaptive control method to be used is, for example, an adaptive control method selected by the adaptive control method of FIG. 6, which will be described in detail later. Next, at step S9, the received signal is demodulated by the demodulator 8, and the signal quality judged by the judging unit 9 is acquired. At step S10, the controller 6 judges whether or not the signal quality is equal to or larger than the predetermined threshold. If YES at step S10, the control flow proceeds to step S11. On the other hand, if NO at step S10, the control flow returns to step S8. At step S11, after the communication process of the relevant radio communication apparatus under the adaptive control of step S8 is executed, the control flow returns to step S1.

The number of interference waves suppressed by the adaptive antenna apparatus is a number obtained by subtracting one from the number of antenna elements, and when the number of interference waves is larger than the number, not all the interference waves can be suppressed. However, by the reception adaptive control process according to the first embodiment, for example, even if the number of interference waves is larger than the number of the antenna elements, the reactance value of the variable reactance element 12 connected to the parasitic element 11 can be controlled to suppress the interference waves. Also, even if there is no interference wave, but desired signal quality cannot be obtained due to weak received electric power of a desired wave, the signal electric power of the desired wave can increase to improve the signal quality by controlling the reactance value of the variable reactance element 12 connected to the parasitic element 11. Thus, the best signal quality can always be acquired by controlling the reactance value of the variable reactance element 12 connected to the parasitic element 11 in addition to the control of the variable gain amplifiers 3a and 3b and the phase shifters 4a and 4b of the reception adaptive control circuit 2.

As described above, according to the first embodiment, when the signal quality equal to or larger than the predetermined threshold cannot be obtained by the adaptive control using the reception adaptive control circuit 2, the reactance value of the variable reactance element 12 is changed to perform the adaptive control. Consequently, for example, even in a relatively low frequency band used in a mobile radio system, the interference waves can be suppressed by a smaller number of antenna elements, and a radio signal having the best signal quality can always be received.

In the first embodiment, the two antenna elements 1a and 1b and the one parasitic element 11 are included. However, the present invention is not limited to this. A plurality of antenna elements and at least one parasitic element (that is, one or a plurality of parasitic elements) may be included.

In the first embodiment, when the execution of the adaptive control using the reception adaptive control circuit 2 fails in obtaining the signal quality equal to or larger than the predetermined threshold, the adaptive control is performed by changing the reactance value of the variable reactance element 12. However, the present invention is not limited to this, and when the execution of the reactance control fails in obtaining the signal quality equal to or larger than the predetermined threshold value, the adaptive control may be performed using the reception adaptive control circuit 2.

In the above-described embodiment, the received electric power level detector 10 detects the received electric power level of the received signal. However the present invention is not limited to this. It may detect a signal level including a signal electric power level, signal voltage level, and the like.

Second Embodiment

Figure 3:
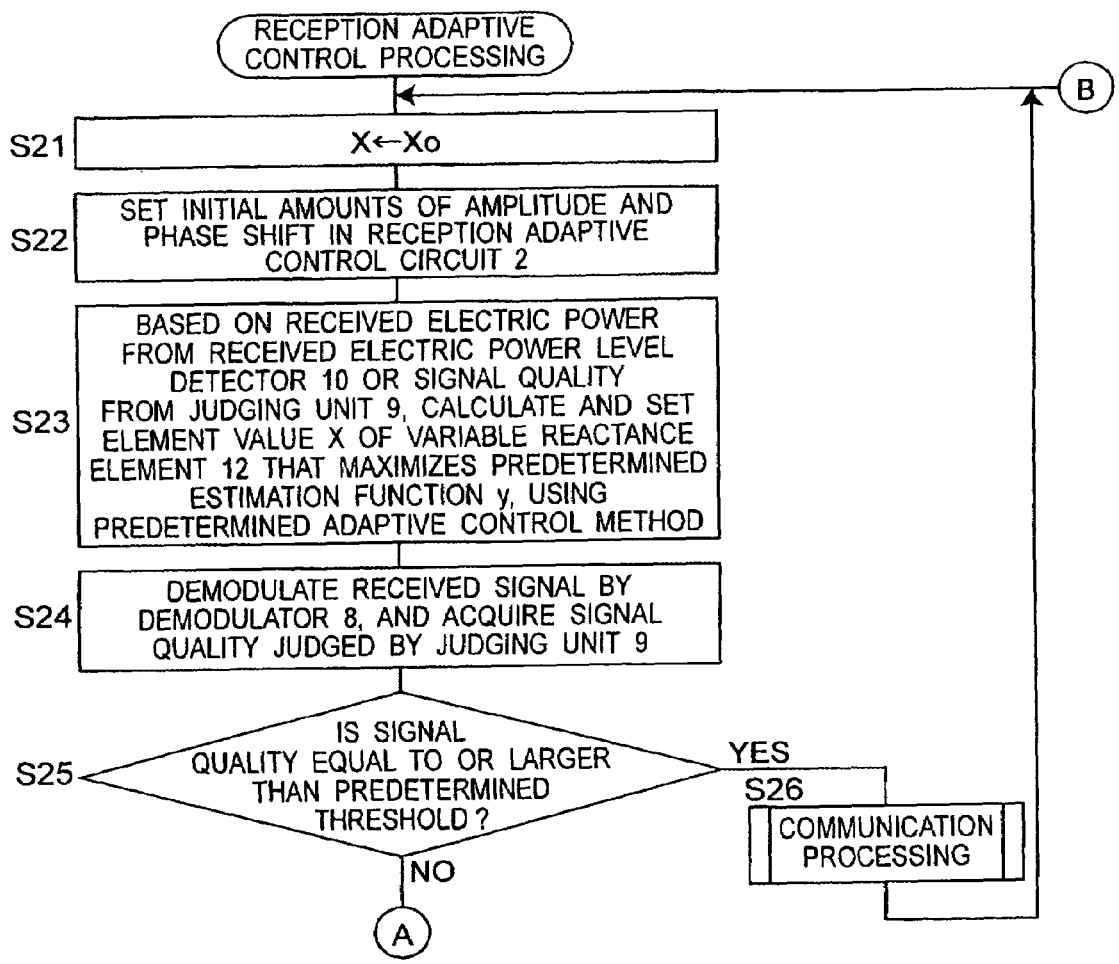
FIG. 3 is a flowchart showing a first part of a reception adaptive control process according to a second embodiment, which is executed by the controller 6 of the adaptive antenna apparatus of FIG. 1.
Figure 4:
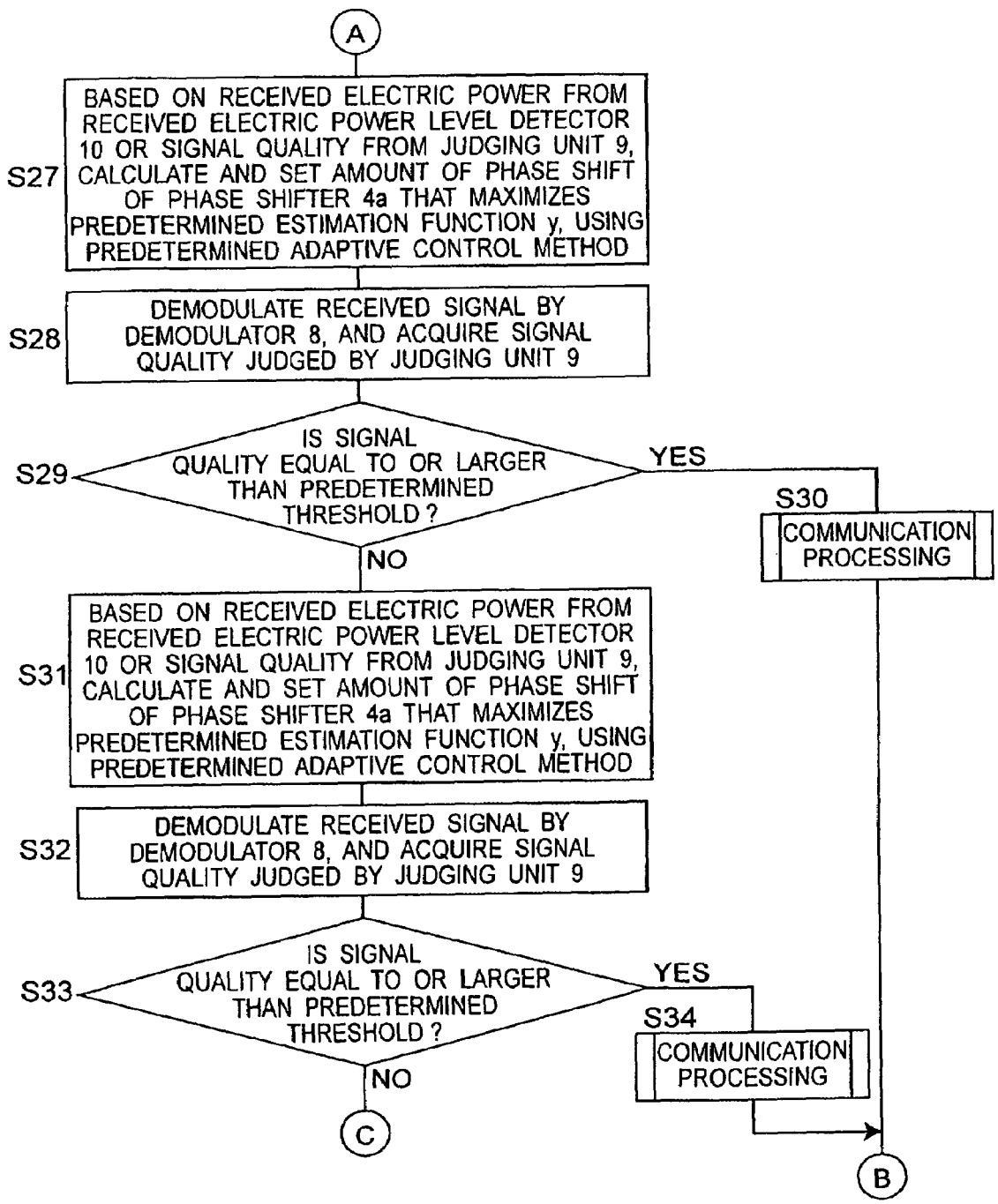
FIG. 4 is a flowchart showing a second part of the reception adaptive control process according to the second embodiment.
Figure 5:
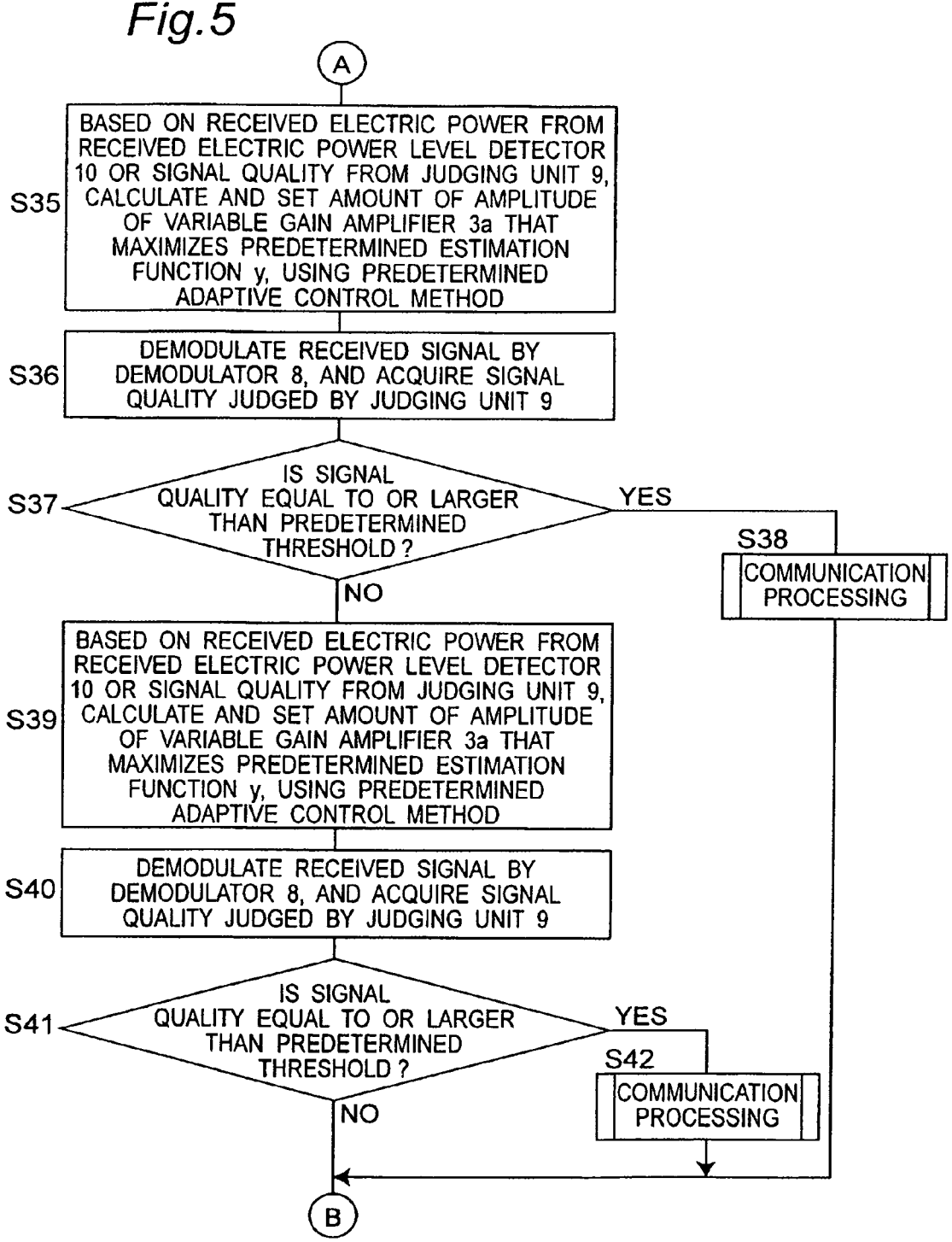
FIG. 5 is a flowchart showing a third part of the reception adaptive control process according to the second embodiment.

FIGS. 3 to 5 are flowcharts showing a reception adaptive control process according to a second embodiment, which is executed by the controller 6 of the adaptive antenna apparatus of FIG. 1.

At step S21 of FIG. 3, the reactance value X of the variable reactance element 12 is set to the predetermined initial value $X_0$ as at step S1 of FIG. 2. At step S22, the amplitude amount and phase shift amount of the initial values are set in the reception adaptive control circuit 2. Next, at step S23, based on the received electric power from the received electric power level detector 10 or the signal quality from the judging unit 9, the element value X of the variable reactance element 12 that maximizes the predetermined estimation function "y" is calculated and set by using the predetermined adaptive control method. At step S24, the received signal is demodulated by the demodulator 8 and the signal quality judged by the judging unit 9 is acquired. At step S25, the controller 6 judges whether or not the signal quality is equal to or larger than the predetermined threshold. If YES at step S25, the control flow proceeds to step S26. On the other hand, if NO at step S25, the control flow proceeds to step S27 of FIG. 4. At step S26, the communication process of the relevant radio communication apparatus is executed under the adaptive control of step S23. The control flow returns to step S21.

At step S27 of FIG. 4, based on the received electric power from the received electric power level detector 10 or the signal quality from the judging unit 9, the phase shift amount of the phase shifter 4a that maximizes the predetermined estimation function "y" is calculated by using the predetermined adaptive control method. At step S28, the received signal is demodulated by the demodulator 8, and the signal quality judged by the judging unit 9 is acquired. Then, at step S29, the controller 6 judges whether or not the signal quality is equal to or larger than the predetermined threshold. If YES at step S29, the control flow proceeds to step S30. On the other hand, if NO at step S29, the control flow proceeds to step S31. At step S30, the communication process of the relevant radio communication apparatus is executed under the adaptive control of step S27. The control flow returns to step S21 of FIG. 3. Next, at step S31, based on the received electric power from the received electric power level detector 10 or the signal quality from the judging unit 9, the phase shift amount of the phase shifter 4b that maximizes the predetermined estimation function "y" is calculated and set by using the predetermined adaptive control method. At step S32, the received signal is demodulated by the demodulator 8, and the signal quality judged by the judging unit 9 is acquired. At step S33, the controller 6 judges whether or not the signal quality is equal to or larger than the predetermined threshold. If YES at step S33, the control flow proceeds to step S34. On the other hand, if NO at step S33, the control flow proceeds to step S35 of FIG. 5. At step S34, the communication process of the relevant radio communication apparatus is executed under the adaptive control of step S31. The control flow returns to step S21 of FIG. 3.

Next, at step S35 of FIG. 5, based on the received electric power from the received electric power level detector 10 or the signal quality from the judging unit 9, the amplitude amount of the variable gain amplifier 3a that maximizes the predetermined estimation function "y" is calculated by using the predetermined adaptive control method. At step S36, the received signal is demodulated by the demodulator 8, and the signal quality judged by the judging unit 9 is acquired. Then, at step S37, the controller 6 judges whether or not the signal quality is equal to or larger than the predetermined threshold. If YES at step S37, the control flow proceeds to step S38. On the other hand, if NO at step S37, the control flow proceeds to step S39. At step S38, the communication process of the relevant radio communication apparatus is executed under the adaptive control of step S35. The control flow returns to step S21 of FIG. 3. Next, at step S39, based on the received electric power from the received electric power level detector 10 or the signal quality from the judging unit 9, the amplitude amount of the variable gain amplifier 3b that maximizes the predetermined estimation function "y" is calculated and set by using the predetermined adaptive control method. At step S40, the received signal is demodulated by the demodulator 8, and the signal quality judged by the judging unit 9 is acquired. At step S41, the controller 6 judges whether or not the signal quality is equal to or larger than the predetermined threshold. If YES at step S41, the control flow proceeds to step S42. On the other hand, if NO at step S41, the control flow returns to step S21 of FIG. 3. At step S42, the communication process of the relevant radio communication apparatus is executed under the adaptive control of step S39. The control flow returns to step S21 of FIG. 3.

According to the second embodiment, when adaptive control that changes the reactance value of the variable reactance element 12 fails to obtain the signal quality equal to or larger than the predetermined threshold, the respective phase shift amounts of the phase shifters 4a and 4b and the respective amplitude amounts of the variable gain amplifiers 3a and 3b are sequentially selected and changed to optimal values to perform the adaptive control, and this process is repeated to control. Consequently, not only the variable reactance element 12 but also the amplitude amount and phase shift amount of the radio signals received by the respective antenna elements 1a and 1b can be optimally set. Thus, even in a relatively low frequency band used in a mobile radio communication system, for example, the interference waves can be suppressed with a smaller number of antenna elements and the radio signal having the best signal quality can always be received.

Third Embodiment

Figure 6:
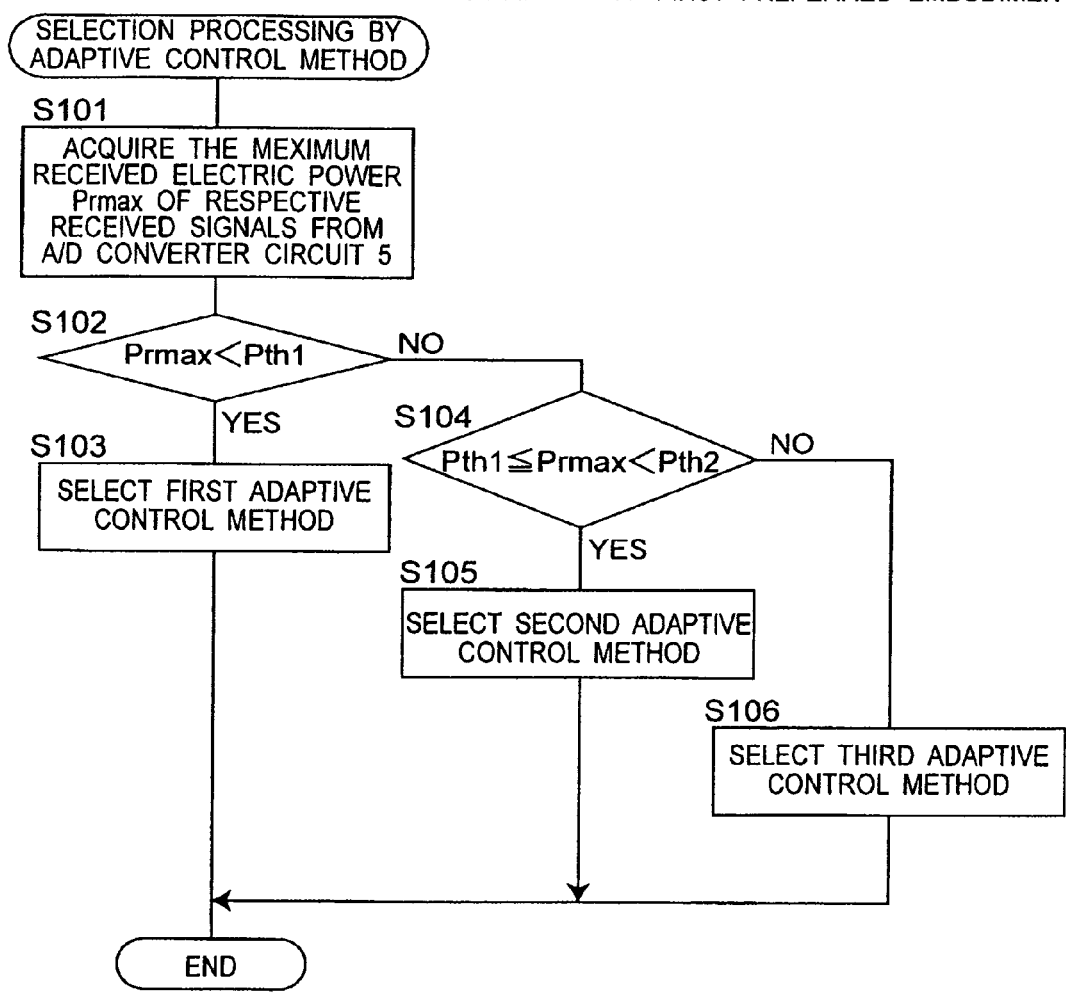
FIG. 6 is a flowchart showing a selection process by an adaptive control method according to a third embodiment, which is executed by the controller 6 of the adaptive antenna apparatus of FIG. 1.

FIG. 6 is a flowchart showing a selection process for an adaptive control method according to third embodiment, which is executed by the controller 6 of the adaptive antenna apparatus of FIG. 1. The selection process by the relevant adaptive control method is a process for selecting one optimal method from the above-described three adaptive control methods, prior to the respective reception adaptive control process disclosed herein. In the selection process, a first threshold Pth1 set to be close and larger than the received electric power with the minimum reception sensitivity by a predetermined margin, and a second threshold Pth2(>Pth1) set to be sufficiently larger than the received electric power with the minimum reception sensitivity (received electric power enabling the operation without any trouble in the radio communication even if the received signal level fluctuates) are used.

At step S101 of FIG. 6, the maximum received electric power $Pr_{max}$ of the received signals from the A/D converter circuit 5 is acquired. At step S102, the controller 6 judges whether or not $Pr_{max}$<Pth1 is true. If $Pr_{max}$<Pth1 then, the control flow proceeds to step S103. On the other hand, if $Pr_{max}$<Pth1, then the control flow proceeds to step S104. At step S103, the first adaptive control method is selected in order to securely execute the radio communication, and the relevant selection process is completed. Next, at step S104, the controller 6 judges whether or not Pth1≦$Pr_{max}$<Pth2 is true. If Pth1≦$Pr_{max}$<Pth2 then, the control flow proceeds to step S105. On the other hand, if Pth1≦$Pr_{max}$<Pth2 is not true, then, the control flow proceeds to step S106. At step S105, since the radio signal is received at a certain level of received electric power and has some margin, the second adaptive control method is selected and the relevant selection process is completed. At step S106, since the signal of almost maximum electric power is received, normal high-speed communication or the like can be executed with little problem, and thus, the third adaptive control method is selected and the relevant selection process is completed.

As described above, according to the selection process for the adaptive control method according to the third embodiment, the optimal adaptive control method can be selected depending on the received electric power.

Fourth Preferred Embodiment

Figure 7:
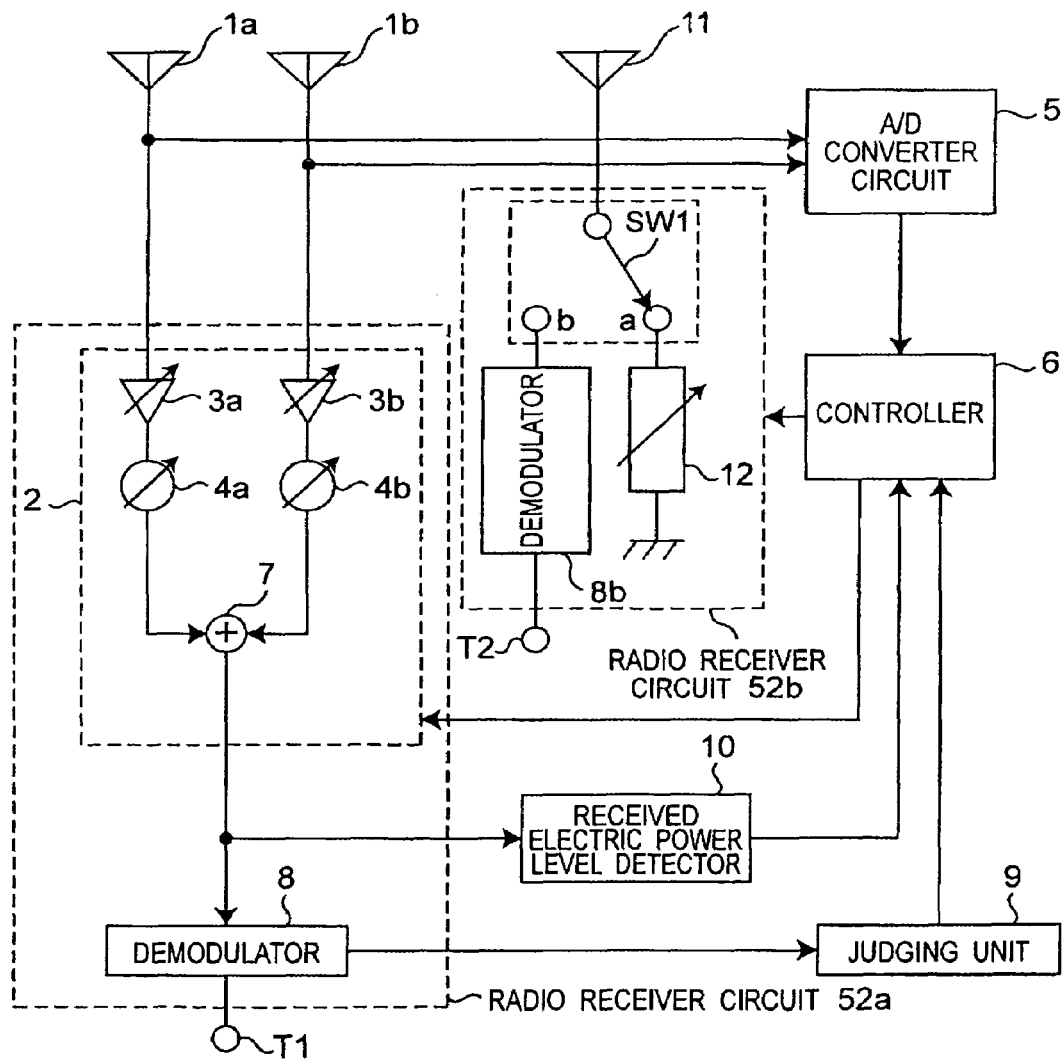
FIG. 7 is a block diagram showing a configuration of an adaptive antenna apparatus according to a fourth embodiment of the present invention.

FIG. 7 is a block diagram showing a configuration of an adaptive antenna apparatus according to a fourth embodiment of the present invention. The adaptive antenna apparatus according to the fourth embodiment is, as shown in FIG. 7, different from that of the first embodiment of FIG. 1 as discussed below.

In a reception adaptive control circuit 2, a variable reactance element 12 is excluded, and there is provided a first radio receiver circuit 52a for portable telephone, for example, consisting of a reception adaptive control circuit 2 and a demodulator 8.

There is provided a second radio receiver circuit 52b for a television receiver, for example, including a switch SW1 connected to an element 11 operating as a parasitic element or an antenna element, a variable reactance element 12, and a demodulator 8b.

A controller 6 adaptively controls variable gain amplifiers 3a and 3b and phase shifters 4a and 4b of the reception adaptive control circuit 2 of the first radio receiver circuit 52a, and adaptively controls a reactance value of the variable reactance element 12 of the second radio receiver circuit 52b.

Hereinafter, the above-mentioned different points are described in detail. Referring to FIG. 7, the radio signal received by the element 11 is grounded via a contact "a" side of the switch SW1 and the variable reactance element 12, and is inputted to the demodulator 8b via a contact "b" side of the switch SW1. The demodulator 8b demodulates the inputted radio signal by using a predetermined digital demodulation method and outputs the demodulated signal via an output terminal T2.

In the adaptive antenna apparatus configured as described above, when the radio signal is received with the first radio receiver circuit 52a, the switch SW1 is switched over to the contact "a" side. At this time, an element value of the variable reactance element 12 connected to the parasitic element 11 can be controlled by reactance control, and operation similar to that of the first embodiment is performed. When the radio signal is received using the second radio receiver circuit 52b (when the radio signal is not received using the antenna elements 1a and 1b), the switch SW1 is switched over to the contact "b" side. At this time, the parasitic element 11 becomes an antenna element, and the radio signal received by the relevant antenna element is inputted to the demodulator 8b via the contact "b" side of the switch SW1. The demodulator 8b demodulates the inputted radio signal by using the predetermined digital demodulating method and outputs a baseband signal after demodulation via the output terminal T2.

As described above, according to the fourth embodiment, in a small-sized mobile radio-communication terminal apparatus, selective switching the radio receiver circuits 52a and 52b for radio communication systems different from each other, allows a radio communication apparatus capable of efficient, adaptive control to be realized.

Fifth Embodiment

Figure 8:
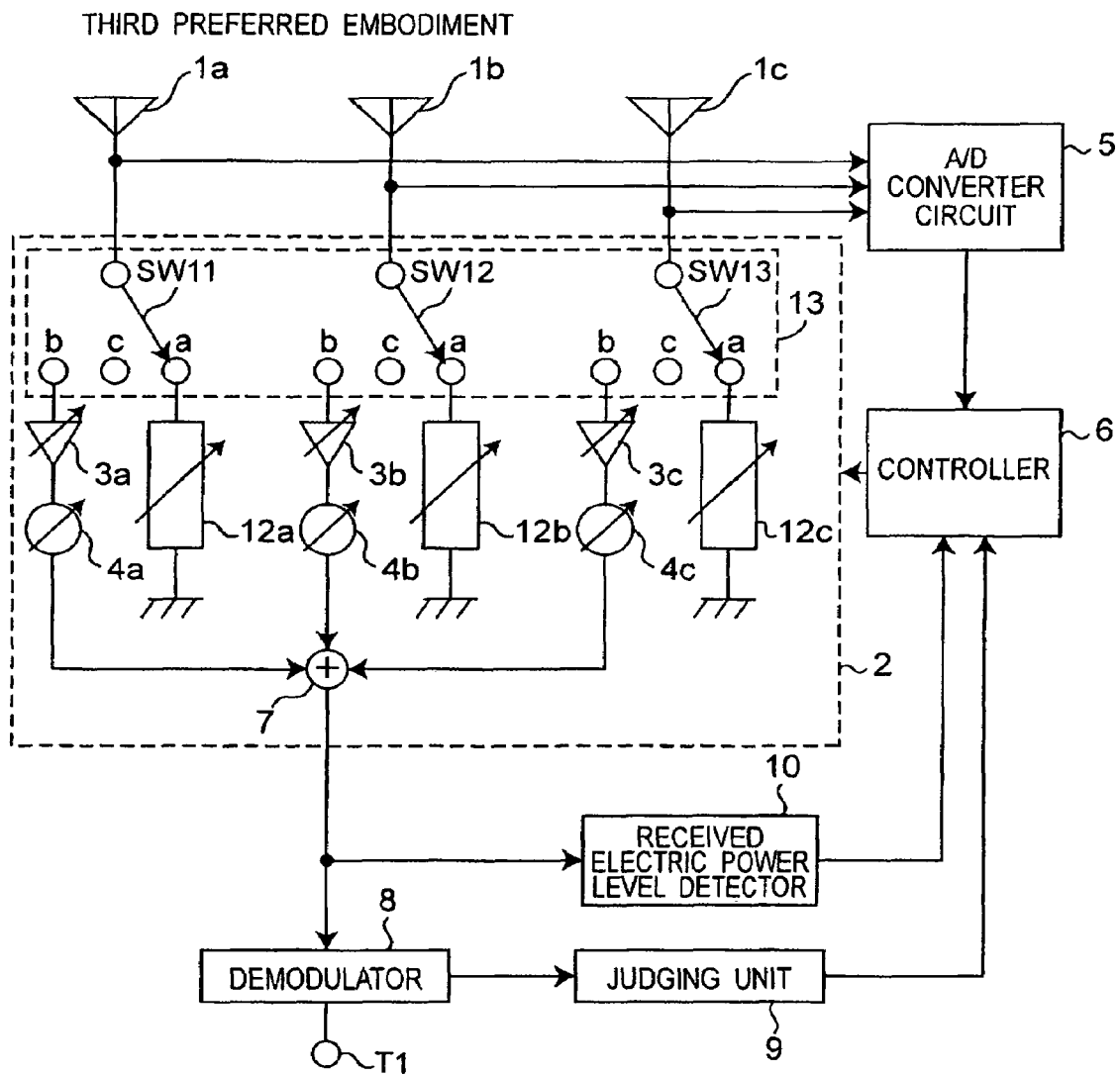
FIG. 8 is a block diagram showing a configuration of an adaptive antenna apparatus according to a fifth embodiment of the present invention.

FIG. 8 is a block diagram showing a configuration of an adaptive antenna apparatus according to a fifth embodiment of the present invention. The fifth embodiment is, as shown in FIG. 8, different from the first embodiment of FIG. 1 as discussed below.

A reception adaptive control circuit 2 includes a switch circuit 13 consisting of three switches SW1, SW12 and SW13 connected to three antenna elements 1a, 1b and 1c, respectively. The adaptive control circuit 2 also includes variable reactance elements 12a, 12b and 12c connected to a contact "a" side of the respective switches SW11, SW12 and SW13, and three pairs of variable gain amplifier and phase shifter (3a, 4a), (3b, 4b), and (3c, 4c) connected to a contact "b" side of the respective switches SW11, SW12 and SW13. Hereinafter, the above-mentioned different points are described in detail.

Referring to FIG. 8, a radio signal received by the antenna element 1a is grounded via the contact "a" side of the switch SW11 and the variable reactance element 12a, and is inputted to a signal combiner 7 via the contact "b" side of the switch SW11, the variable gain amplifier 3a, and the phase shifter 4a. Moreover, a radio signal received by the antenna element 1b is grounded via the contact "a" side of the switch SW12 and the variable reactance element 12b, and is inputted to the signal combiner 7 via the contact "b" side of the switch SW12, the variable gain amplifier 3b, and the phase shifter 4b. Furthermore, a radio signal received by the antenna element 1c is grounded via the contact "a" side of the switch SW13 and the variable reactance element 12c, and is inputted to the signal combiner 7 via the contact "b" side of the switch SW13, the variable gain amplifier 3c, and the phase shifter 4c. Each of the switches SW11, SW12 and SW13 further has a contact point "c" of an open terminal so as to enable impedance matching between each of the antenna elements 1a, 1b and 1c, and an input terminal of the A/D converter circuit 5 when the received signal is subjected to A/D conversion in the A/D converter circuit 5. The controller 6 adaptively controls the switching of the switches SW11, SW12 and SW13 of the reception adaptive control circuit 2, the amplitude amount and phase shift amount of the three pairs of variable gain amplifier and phase shifter (3a, 4a), (3b, 4b), and (3c, 4c), as described below in detail.

FIGS. 9 and 10 are flowcharts showing a reception adaptive control process according to the fifth embodiment, which is executed by the controller 6 of the adaptive antenna apparatus of FIG. 8.

At step S51 of FIG. 9, the switch SW11 is first switched over to the contact "c" side, the switch SW12 is switched over to the contact "c" side, and the switch SW13 is switched over to the contact "c" side. Moreover, for a reactance value $X_i$(i=1, 2, 3) of the variable reactance elements 12a, 12b and 12c, a predetermined initial value $X_0$ is set in a manner similar to that of the first embodiment. Next, at step S52, the respective amplitude amount of the variable gain amplifiers 3a, 3b and 3c of the reception adaptive control circuit 2 are set to an initial value of 1, and the respective phase shift amounts of the phase shifters 4a, 4b and 4c are set to an initial value of 0. At step S53, electric power levels of the signals received by the respective antenna elements 1a, 1b and 1c are detected from the A/D converter circuit 5. At step S54, one antenna element that has received the signal having the maximum received electric power level is selected. At step S55, the switch connected to the selected antenna element (one of the SW11, SW12 and SW13) is switched over to the contact "b" side, while the two switches connected to the two unselected antenna elements are switched over to the contact "a" side, respectively. Moreover, at step S56, the received signal is demodulated by a demodulator 8, and the signal quality judged by a judging unit 9 is acquired. At step S57, the controller 6 judges whether or not the signal quality is equal to or larger than a predetermined threshold. If YES at step S57, the control flow proceeds to step S58. On the other hand, if NO at step S57, the control flow proceeds to step S59. At step S58, the communication process of the relevant radio communication apparatus is executed in the state of step S56. The control flow returns to step S51.

Next, at step S59, one antenna element that has received the signal having the maximum electric power level, and one antenna element that has received a signal having the second-largest electric power level are selected. At step S60, the switches connected to the two selected antenna elements (two of SW11, SW12 and SW13) are switched over to the contact "c" side, while the one switch connected to one unselected antenna element is switched over to the contact "a" side. Then, at step S61, received data of the signals received by the respective selected two antenna elements is acquired from the A/D converter circuit 5. At step S62, after the two switches connected to the selected two antenna elements are switched over to the contact "b" side, based on the acquired received data, the amplitude amount and phase shift amount to be controlled by reception adaptive control by the reception adaptive control circuit 2 are calculated based on the calculated amplitude amount and phase shift amount, the reception adaptive control circuit 2 is controlled. Furthermore, at step S63, the received signal is demodulated by the demodulator 8, and the signal quality judged by the judging unit 9 is acquired. Then, at step S64, the controller 6 judges whether or not the signal quality is equal to or larger than the predetermined threshold. If YES at step S64, the control flow proceeds to step S65. On the other hand, if NO at step S64, the control flow proceeds to step S66 of FIG. 10. At step S65, the communication process of the relevant radio communication apparatus is executed in the state of step S63. The control flow proceeds to step S51.

At step S66 of FIG. 10, based on the received electric power from an electric power level detector 10 or the signal quality from the judging unit 9, an element value $X_j$ of a variable reactance element (one of 12a, 12b and 12c) connected to the one unselected antenna element that maximizes the predetermined estimation function "y" is calculated and set by using the predetermined adaptive control method. Then, at step S67, the received signal is demodulated by the demodulator 8, and the signal quality judged by the judging unit 9 is acquired. In this case, the execution of the reactance control to the element value X of the variable reactance element allows a better radiation pattern of the adaptive antenna apparatus to be obtained. At step S68, the controller 6 judges whether or not the signal quality is equal to or larger than the predetermined threshold. If YES at step S68, the control flow proceeds to step S69. On the other hand, if NO at step S68, the control flow proceeds to step S70. At step S69, the communication process of the relevant radio communication apparatus is executed under the adaptive control of step S66. The control flow returns to step S51 of FIG. 9. At step S70, the reception adaptive process using the three antenna elements of FIG. 11 is executed. The control flow returns to step S51 of FIG. 9.

FIG. 11 is a flowchart showing a reception adaptive process (step S70) using the three antenna elements, which is a subroutine of FIG. 10.

At step S71 of FIG. 11, the switches SW11, SW12 and SW13 connected to the three antenna elements 1a, 1b and 1c are switched over to the contact "c" side, respectively. Then, at step S72, the received data of the respective antenna elements 1a, 1b and 1c is acquired from the A/D converter circuit 5. Next, at step S73, the switches SW1, SW12 and SW13 are switched over to the contact "b" side, respectively. The amplitude amount and phase shift amount to be controlled by reception adaptive control by the reception adaptive control circuit 2 are calculated based on the acquired received data. The reception adaptive control circuit 2 is controlled based on the calculated amplitude amount and phase shift amount. At step S74, the communication process of the relevant radio communication apparatus is executed under the adaptive control of step S73. The control flow returns to the original main routine.

As described above, according to the fifth embodiment, when the signal quality upon receiving the signal by one antenna element of the three antenna elements 1a, 1b and 1c that receives the signal of the maximum electric power level of the received electric power levels by the respective antenna elements 1a, 1b and 1c is not equal to or larger than the predetermined threshold, and the signal quality when the signals are received by two antenna elements that receive the signals of the maximum and the second-largest electric power levels is not equal to or larger than the predetermined threshold, so that the desired signal quality cannot be obtained, and then, by changing the reactance value of the variable reactance element 12 to perform adaptive control, a better radiation pattern can be obtained. Moreover, when the desired signal quality cannot be obtained by the adaptive control of the reactance value of the relevant variable reactance element 12, then the three antenna elements 1a, 1b and 1c are used to execute the reception adaptive process. Accordingly, even in a relatively low frequency band used in a mobile radio system, for example, interference waves can be suppressed with a smaller number of antenna elements, and the radio signal having the best signal quality can always be received.

Sixth Embodiment

Figure 13:
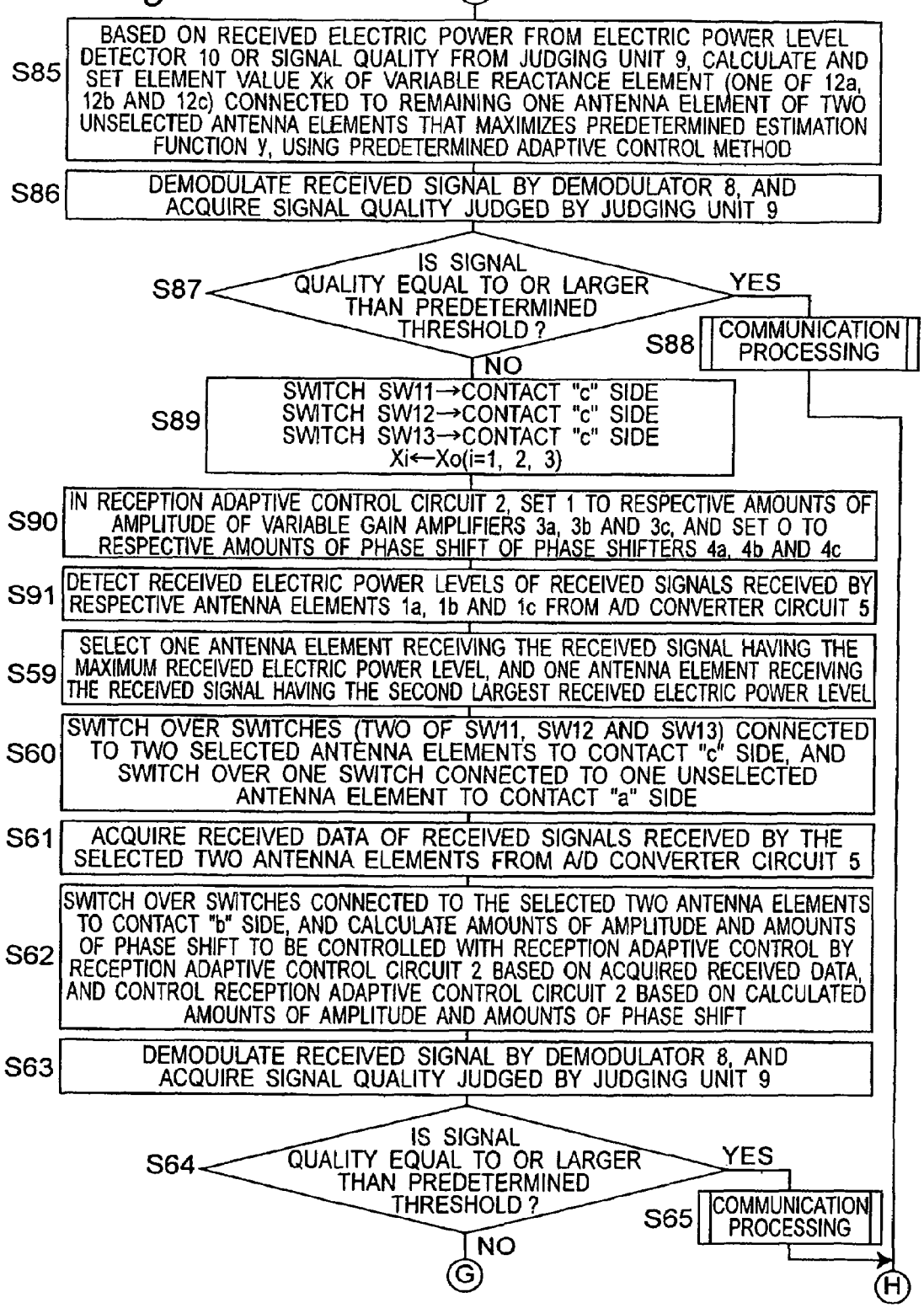
FIG. 13 is a flowchart showing a second part of the reception adaptive control process according to the sixth embodiment.
Figure 14:
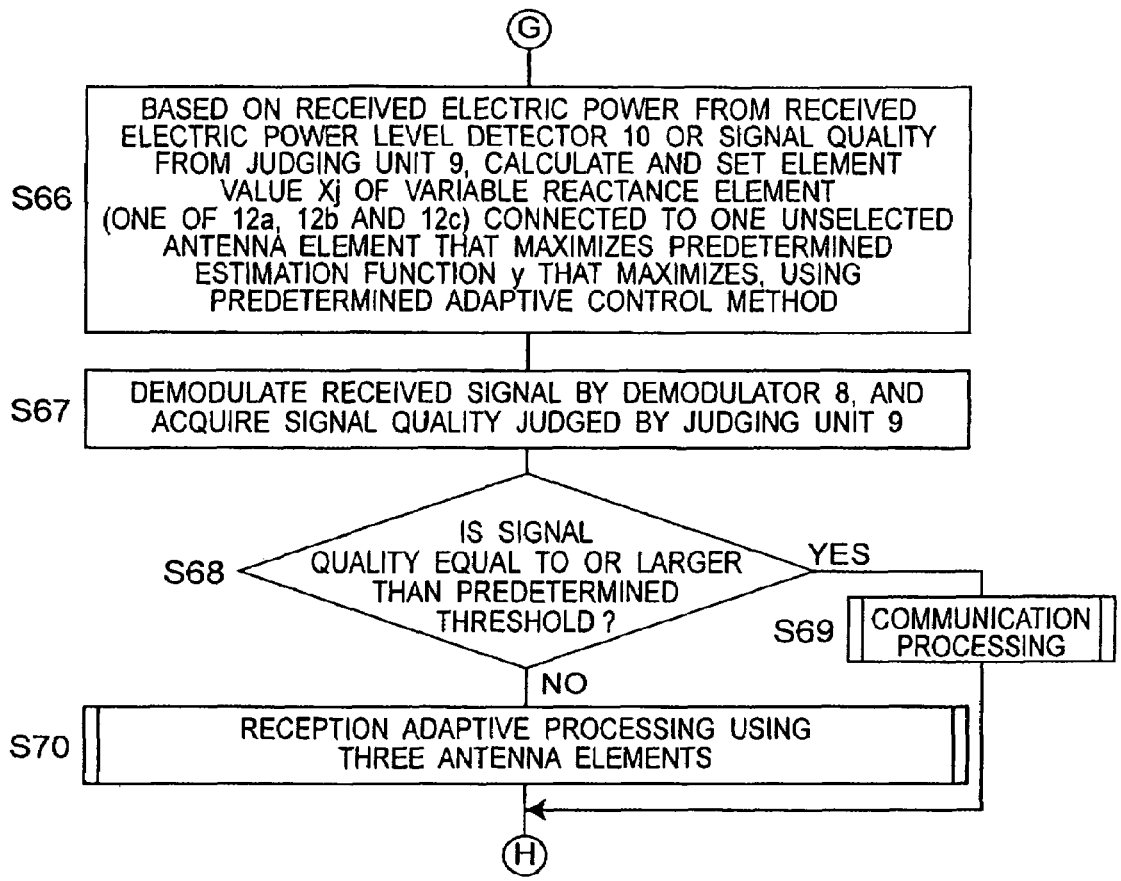
FIG. 14 is a flowchart showing a third part of the reception adaptive control process according to the sixth embodiment.

FIGS. 12 to 14 are flowcharts showing a reception adaptive control process according to a sixth embodiment, which is executed by the controller 6 of the adaptive antenna apparatus of FIG. 8. The reception adaptive control process according to the sixth embodiment is different from the reception adaptive control process of FIGS. 9 and 10 at the following point.

The processes from steps S81 through S91 are inserted between the case of NO at steps S57 and S59. Hereinafter, this different point is described in detail.

If NO at step S57 of FIG. 12, at step S81, based on the received electric power from the electric power level detector 10 or the signal quality from the judging unit 9, the element value $X_j$ of the variable reactance element (one of 12a, 12b and 12c) connected to one of the two unselected antenna elements that maximizes the predetermined estimation function "y" is calculated and set by using the predetermined adaptive control method. Next, at step S82, the received signal is demodulated by the demodulator 8, and the signal quality judged by the judging unit 9 is acquired. At step S83, the controller 6 judges whether or not the signal quality is equal to or larger than the predetermined threshold. If YES at step S83, the control flow proceeds to step S84. On the other hand, if NO at step S83, the control flow proceeds to step S85 of FIG. 13. At step S84, the communication process of the relevant radio communication apparatus is executed under the adaptive control of step S81. The control flow returns to step S51.

At step S85 of FIG. 13, based on the electric power from the electric power level detector 10 or the signal quality from the judging unit 9, an element value $X_k$ of the variable reactance element (one of 12a, 12b and 12c) connected to the remaining one of the two unselected antenna elements that maximizes the predetermined estimation function "y" is calculated and set by using the predetermined adaptive control method. Then, at step S86, the received signal is demodulated by the demodulator 8, and the signal quality judged by the judging unit 9 is acquired. At step S87, the controller 6 judges whether or not the signal quality is equal to or larger than the predetermined threshold. If YES at step S87, the control flow proceeds to step S88. On the other hand, if NO at step S87, the control flow proceeds to step S89. At step S88, the communication process of the relevant radio communication apparatus is executed under the adaptive control of step S85. The control flow returns to step S51 of FIG. 12.

At step S89, the switch SW11 is switched over to the contact "c" side, the switch SW12 is switched over to the contact "c" side, and the switch SW13 is switched over to the contact "c" side. Moreover, the reactance value $X_i$ of each of the variable reactance elements 12a, 12b and 12c is initialized to a predetermined initial value $X_0$ in a manner similar to that of the first embodiment. Next, at step S90, each of the amplitude amounts of the variable gain amplifiers 3a, 3b and 3c of the reception adaptive control circuit 2 is set to an initial value of 1, and each of the phase shift amounts of the phase shifters 4a, 4b and 4c is set to an initial value of 0. At step S91, the electric power levels of the signals received by the respective antenna elements 1a, 1b and 1c are detected from the A/D converter circuit 5, and the control flow proceeds to step S59. The process after the relevant step S59 is similar to that of the fifth embodiment.

As described above, according to the sixth embodiment, in addition to the action and effect of the fifth embodiment, when the signal quality upon receiving the signal by one antenna element of the three antenna elements 1a, 1b and 1c that receives the signal of the maximum electric power level of the received electric power levels by the respective antenna elements 1a, 1b and 1c does not reach any desired level, the element value X of the variable reactance element connected to one antenna element of the two unselected antenna elements is controlled by reactance control. At this time, when the desired signal quality cannot be obtained, the element value X of the variable reactance element connected to the remaining one antenna element is further controlled by reactance control. Accordingly, as compared with the fifth embodiment a better radiation pattern of the adaptive antenna apparatus can be obtained by combining the reactance control, and even in a relatively low frequency band used in a mobile radio system, for example, interference waves can be suppressed with a smaller number of antenna elements, and a radio signal having the best signal quality can always be received.

Seventh Embodiment

Figure 15:
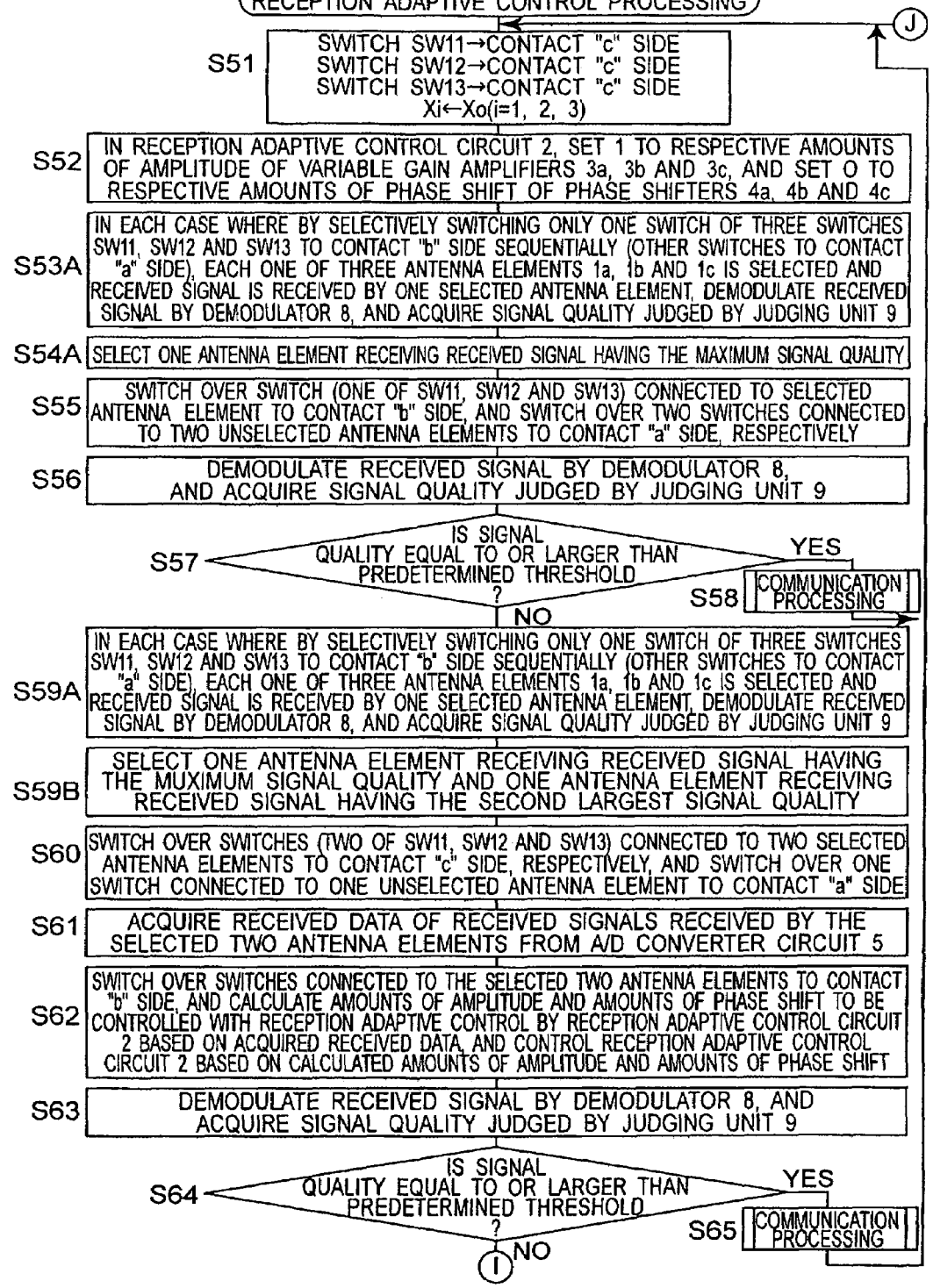
FIG. 15 is a flowchart showing a first part of a reception adaptive control process according to a seventh embodiment, which is executed by the controller 6 of the adaptive antenna apparatus of FIG. 8.
Figure 16:
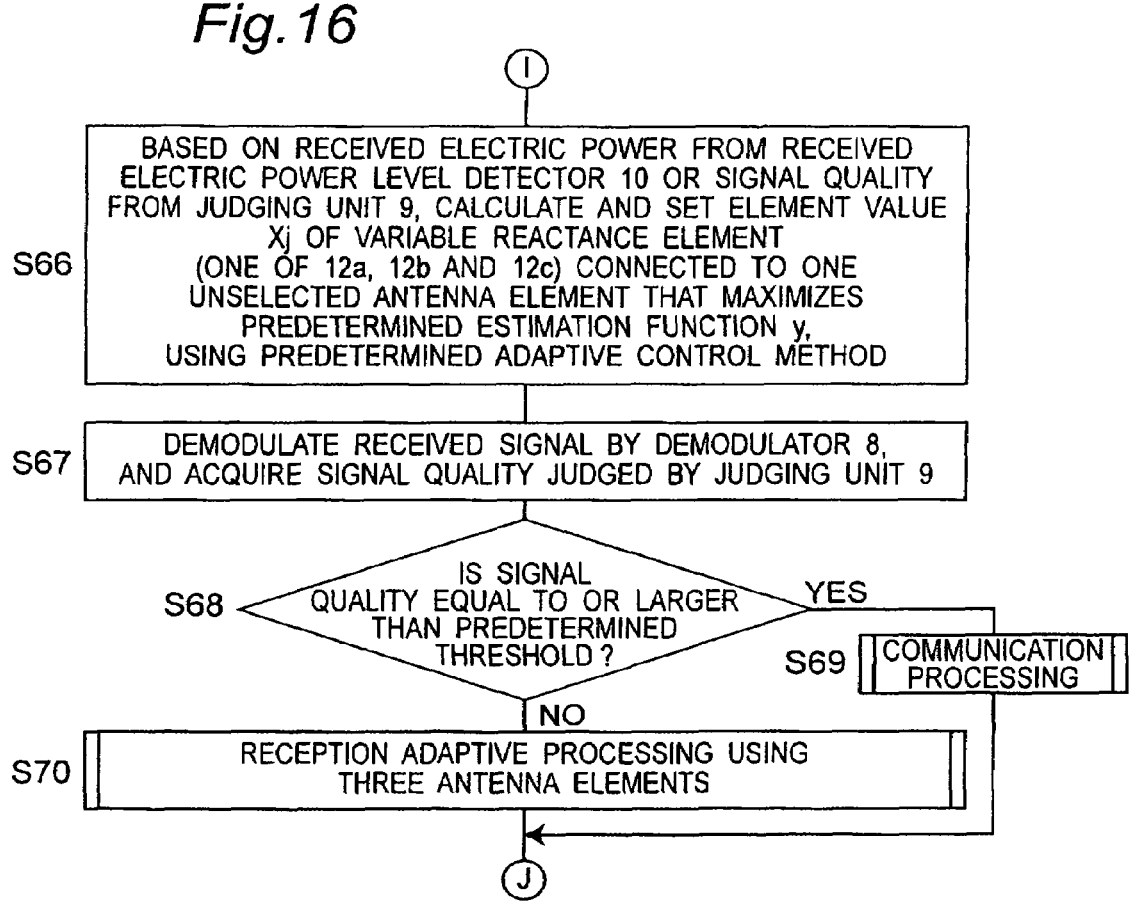
FIG. 16 is a flowchart showing a second part of the reception adaptive control process according to the seventh embodiment.

FIGS. 15 and 16 are flowcharts showing a reception adaptive control process according to a seventh embodiment, which is executed by the controller 6 of the adaptive antenna apparatus of FIG. 8. The reception adaptive control process according to the seventh embodiment is different from the reception adaptive control process of FIGS. 9 and 10 at the following points:

In place of steps S53 and S54, steps S53A and S54A are executed and in place of step S59, steps S59A and S59B are executed.

Hereinafter, these different points are described in detail.

After step S52 of FIG. 15 is executed, at step S53A, in each case where one antenna element of the three antenna elements 1a, 1b and 1c is selected by selectively switching only one switch of the three switches SW11, SW12 and SW13 over to the contact "b" side sequentially (the other switches are switched over to the contact "a" side). A signal is received by the one selected antenna element. The received signal is demodulated by the demodulator 8. The signal quality judged by the judging unit 9 is acquired. Next, at step S54A, one antenna element that has received a signal having the maximum signal quality is selected. The control flow proceeds to step S55.

If NO at step S57 of FIG. 15, at step S59A, in each case where one antenna element of the three antenna elements 1a, 1b and 1c is selected by selectively switching only one switch of the three switches SW11, SW12 and SW13 over to the contact "b" side sequentially (the other switches are switched over to the contact "a" side, a received signal is received by the one selected antenna element. The received signal is demodulated by the demodulator 8. The signal quality judged by the judging unit 9 is acquired. Next, at step S59B, one antenna element that has received a signal having the maximum signal quality, and one antenna element that has received a signal having the second-largest signal quality are selected. The control flow proceeds to step S60.

As described above, according to the seventh embodiment, the adaptive control is performed such that when one antenna element that can receive a signal having the maximum signal quality is selected from the three antenna elements 1a, 1b and 1c to receive the signal, but desired signal quality cannot be obtained. Then, two antenna elements that can receive the signal having the maximum signal quality and the signal of the second-largest signal quality are selected to receive the signals. Accordingly, even in a relatively low frequency band used in a mobile radio system, for example, interference waves can be suppressed by a smaller number of antenna elements, and a radio signal having the best signal quality can always be received.

Eighth Embodiment

Figure 17:
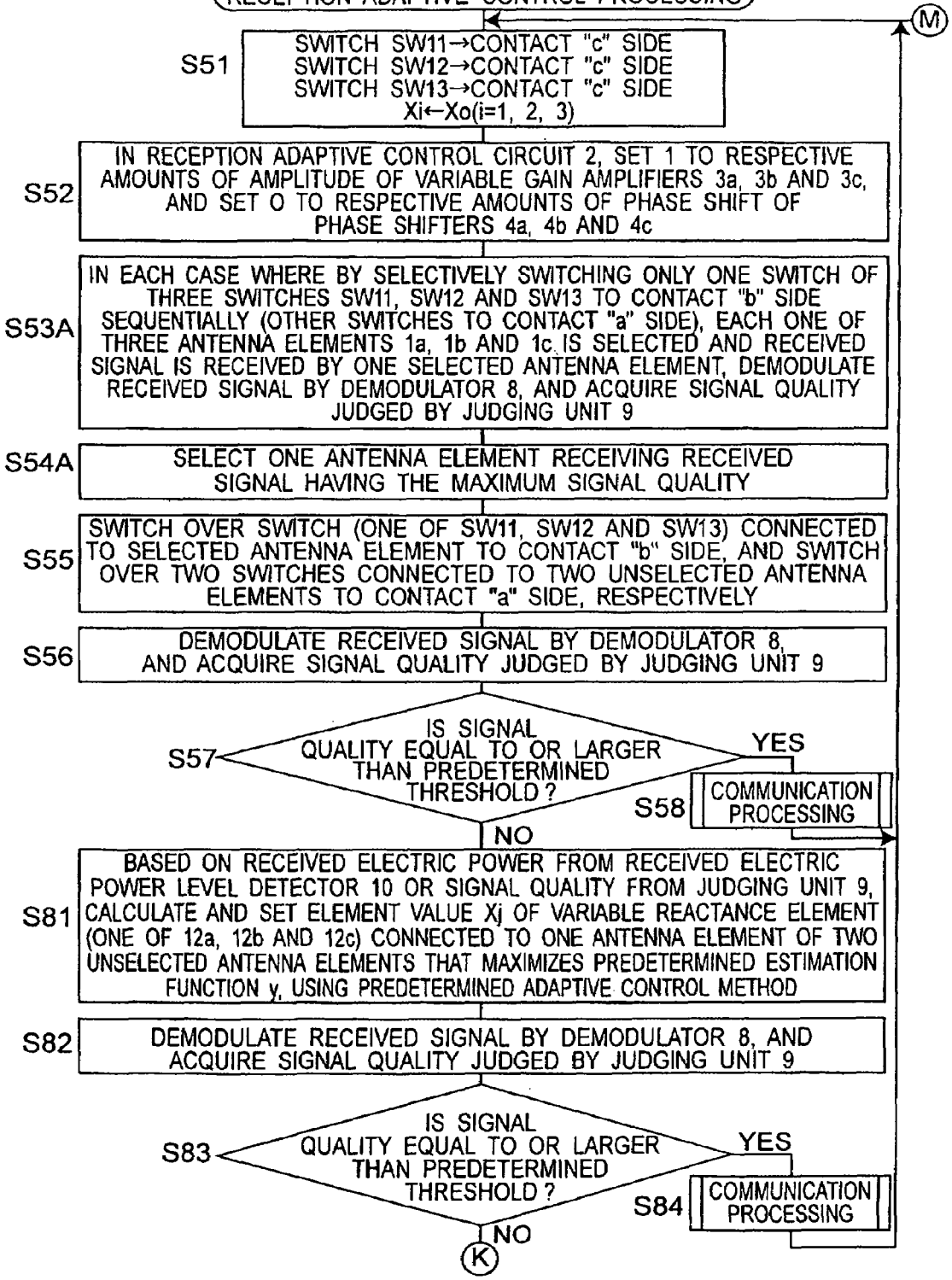
FIG. 17 is a flowchart showing a first part of a reception adaptive control process according to an eighth embodiment, which is executed by the controller 6 of the adaptive antenna apparatus of FIG. 8.
Figure 18:
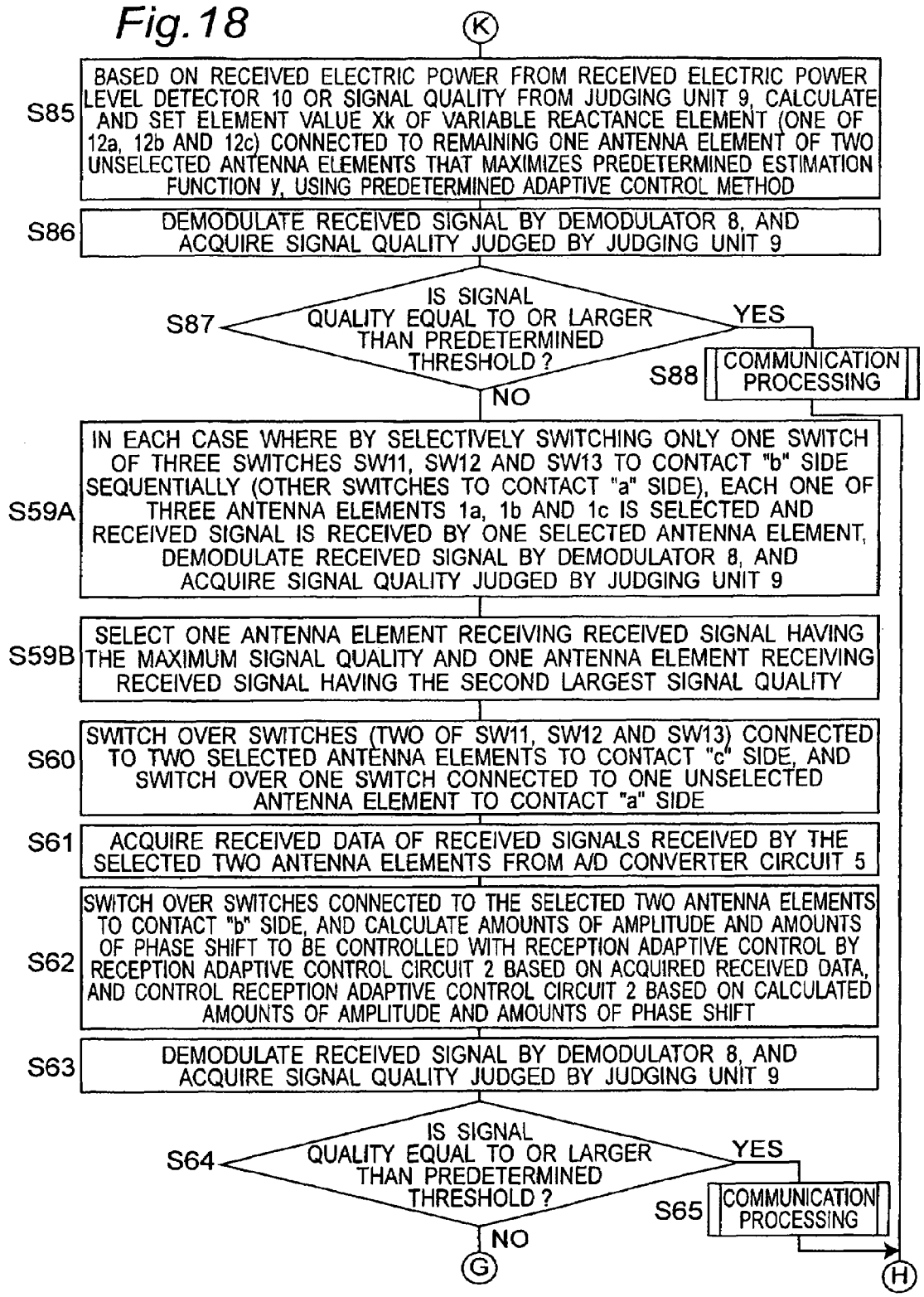
FIG. 18 is a flowchart showing a second part of the reception adaptive control process according to the eighth embodiment.
Figure 19:
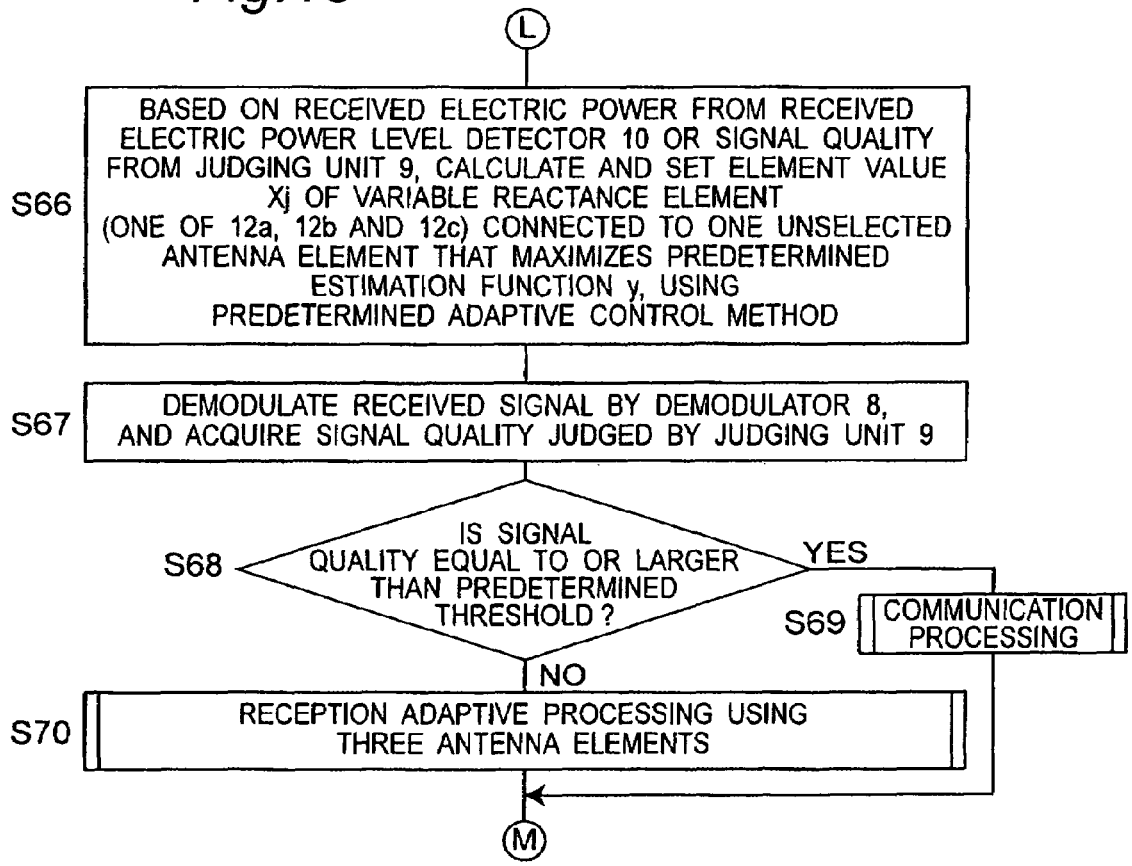
FIG. 19 is a flowchart showing a third part of the reception adaptive control process according to the eighth embodiment.

FIGS. 17 to 19 are flowcharts showing a reception adaptive control process according to an eighth embodiment, which is executed by the controller 6 of the adaptive antenna apparatus of FIG. 8. The reception adaptive control process according to the eighth embodiment is a combination of the sixth embodiment and that of the seventh embodiment, and is different from that of the sixth embodiment of FIGS. 12 to 14 at the following points:

In place of steps S53 and S54 of FIG. 12, steps S53A and S54A of FIG. 15 are executed in place of steps S89 to S91 and S59 of FIG. 13, steps S59A and S59B of FIG. 15 are executed.

In the above-described eighth embodiment, one antenna element that can receive a signal having the maximum signal quality of the three antenna elements 1a, 1b and 1c is selected to receive the signal. When desired signal quality cannot be obtained, the element value X of the variable reactance element connected to one antenna element of the two unselected antenna elements is controlled by reactance control. At this time, when the desired signal quality cannot be obtained, the element value X of the variable reactance element connected to the remaining one antenna element is controlled by reactance control. Further, at this time, when the desired signal quality cannot be obtained, the one antenna element that can receive the signal having the maximum signal quality of the three antenna elements 1a, 1b and 1c is selected, and the control flow shifts from the process to a process for receiving the signal. Accordingly, one antenna element that can receive a signal having the maximum signal quality is selected to receive the signal. When the desired signal quality cannot be obtained, the reactance control is performed so as to obtain a better radiation pattern. Thus, for example, even in a relatively low frequency band used in a mobile radio system, interference waves can be suppressed by a smaller number of antenna elements, and a radio signal having the best signal quality can always be received.

Ninth Embodiment

Figure 20:
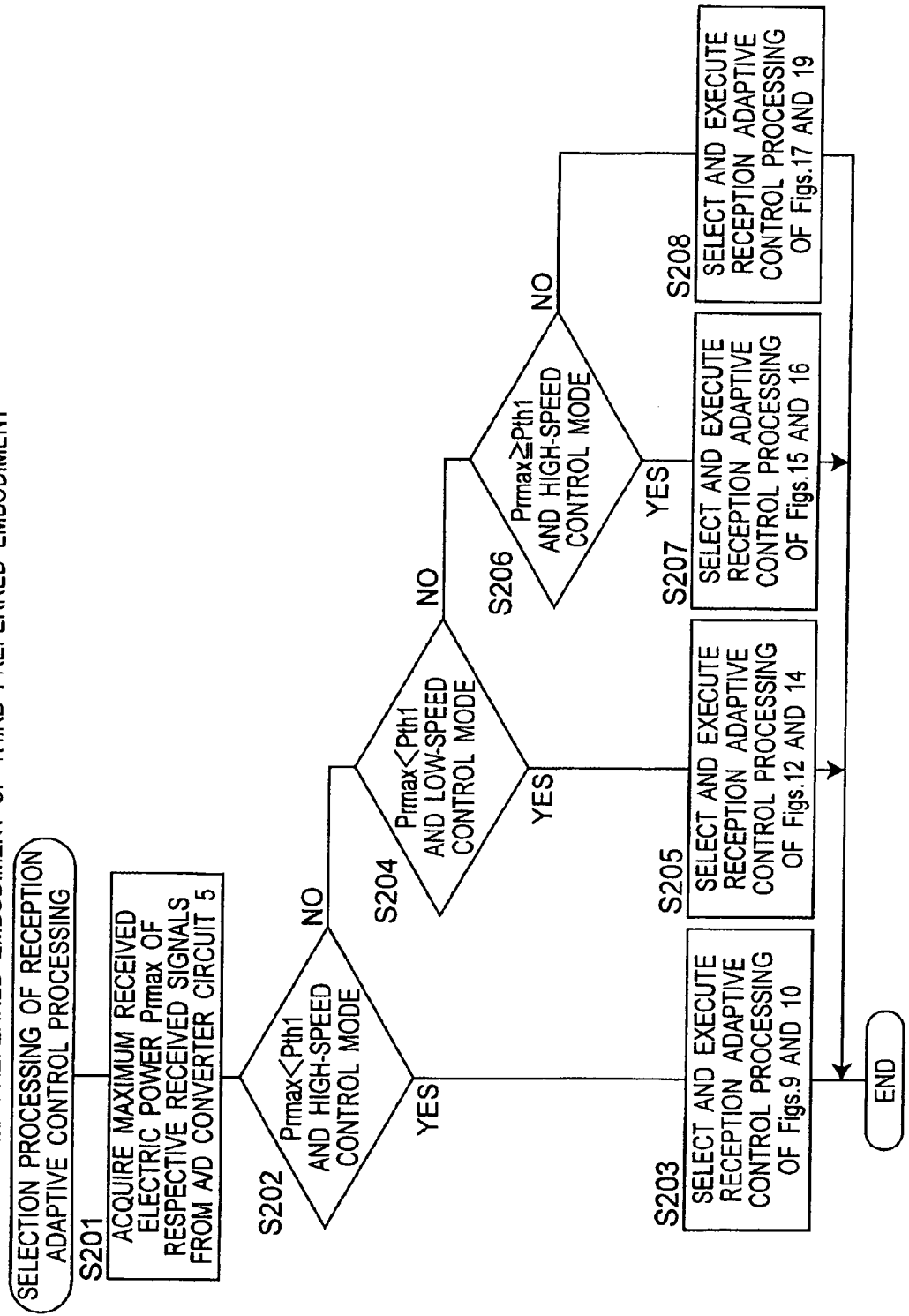
FIG. 20 is a flowchart showing a selection process in a reception adaptive control process according to a ninth embodiment, which is executed by the controller 6 of the adaptive antenna apparatus of FIG. 8.

FIG. 20 is a flowchart showing a selection process in a reception adaptive control process according to a ninth embodiment, which is executed by the controller 6 of the adaptive antenna apparatus of FIG. 8. The relevant selection process is executed for determining which reception adaptive control process according to the fifth through ninth embodiments is to be selected, and is executed prior to the reception adaptive control process. Referring to FIG. 20, high-speed control mode is referred to as a case where a control time of the controller has no margin when the controller processes a large-capacity data such as a video other than audio, for example. Moreover, low-speed control mode is referred to as a case where the control time of the controller has margin when the controller processes a small-capacity data such as audio. Furthermore, in a manner similar to that of the case of FIG. 6, a threshold Pth1 indicates a first threshold set to be close and larger than received electric power of the minimum reception sensitivity by a predetermined margin.

At step S201 of FIG. 20, the maximum received electric power $Pr_{max}$ is acquired from the A/D converter circuit 5. At step S202, the controller 6 judges whether or not $Pr_{max}$<Pth1 is true and high-speed control mode is set. If YES at step S202, the control flow proceeds to step S203. On the other hand, if NO at step S202, the control flow proceeds to step S204. At step S203, the reception adaptive control process of FIGS. 9 and 10 is selected and executed, and then, the relevant selection process is completed. Next, at step S204, the controller 6 judges whether or not $Pr_{max}$<Pth1 is true and low-speed control mode is set. If YES at step S204, the control flow proceeds to step S205. On the other hand, if NO at step S204, the control flow proceeds to step S206. At step S205, the reception adaptive control process of FIGS. 12 to 14 is selected and executed, and then, the relevant selection process is completed. Furthermore, at step S206, the controller 6 judges whether or not $Pr_{max} \geq$ Pth1 is true and high-speed control mode is set. If YES at step S206, the control flow proceeds to step S207. On the other hand, if NO at step S206, the control flow proceeds to step S208. At step S207, the reception adaptive control process of FIGS. 15 and 16 is selected and executed, and then, the selection process is completed. At step S208, the reception adaptive control process of FIGS. 17 to 19 is selected, and then, executed and the relevant selection process is completed.

By executing the selection process of FIG. 20, the reception adaptive control process according to the fifth through ninth embodiments can be appropriately selected, depending on the maximum received electric power and the degree of margin of the control time of the controller (that is, whether it is the high-speed control mode or the low-speed control mode is set; and further, in the case where a size of the used circuit is limited, a degree of margin of a electric power supply capacity or used current capacity is also related).

Fifth Through Ninth Embodiments

In the fifth through ninth embodiments, the three antenna elements 1a, 1b and 1c are provided. However, the present invention is not limited to this. Two antenna elements, or four or more antenna elements may be provided. Moreover, three pairs of receptive adaptive controllers (one pair of reception adaptive controller consists of a variable gain amplifier and a phase shifter), and the variable reactance elements 12a, 12b and 12c are provided so as to correspond to the antenna elements 1a, 1b and 1c, respectively, via the switches SW11, SW12 and SW13. However, the present invention is not limited to this. The three pairs of reception adaptive controllers (one pair of reception adaptive controller consists of a variable gain amplifier and a phase shifter), and the variable reactance elements 12a, 12b and 12c may be provided so as to correspond to at least one part of the respective antenna elements 1a, 1b and 1c. Namely, each of at least one part of antenna elements may be directly connected to the reception adaptive controller or the variable reactance element without passing through the switch.

The configurations as described above allow the antenna element for use in directivity adaptive control to be selected according to a status of use. For example, in the case where stable high-speed communication is required, or in the case where a control time and an electric power supply capacity have margin under an environment where a plurality of different interference waves arrive, three antenna elements are used for directivity adaptive control. This is because under the directivity adaptive control, the required number of radio communication circuits is equivalent to the number of the used antenna elements, which results in larger electric power consumption. Otherwise, two antenna elements can be selected, or in the case where the control time and the electric power source capacity have no margin, one antenna element is selected and the remaining two can be connected to parasitic elements. Furthermore, when one or two antenna elements are used, the selection of the antenna element will also be important. For example, in the case where two antenna elements are selected, selecting the two of which the antenna element interval is the largest reduces the correlation between the antenna elements, and this leads to larger signal quality.

Tenth Embodiment

Figure 21:
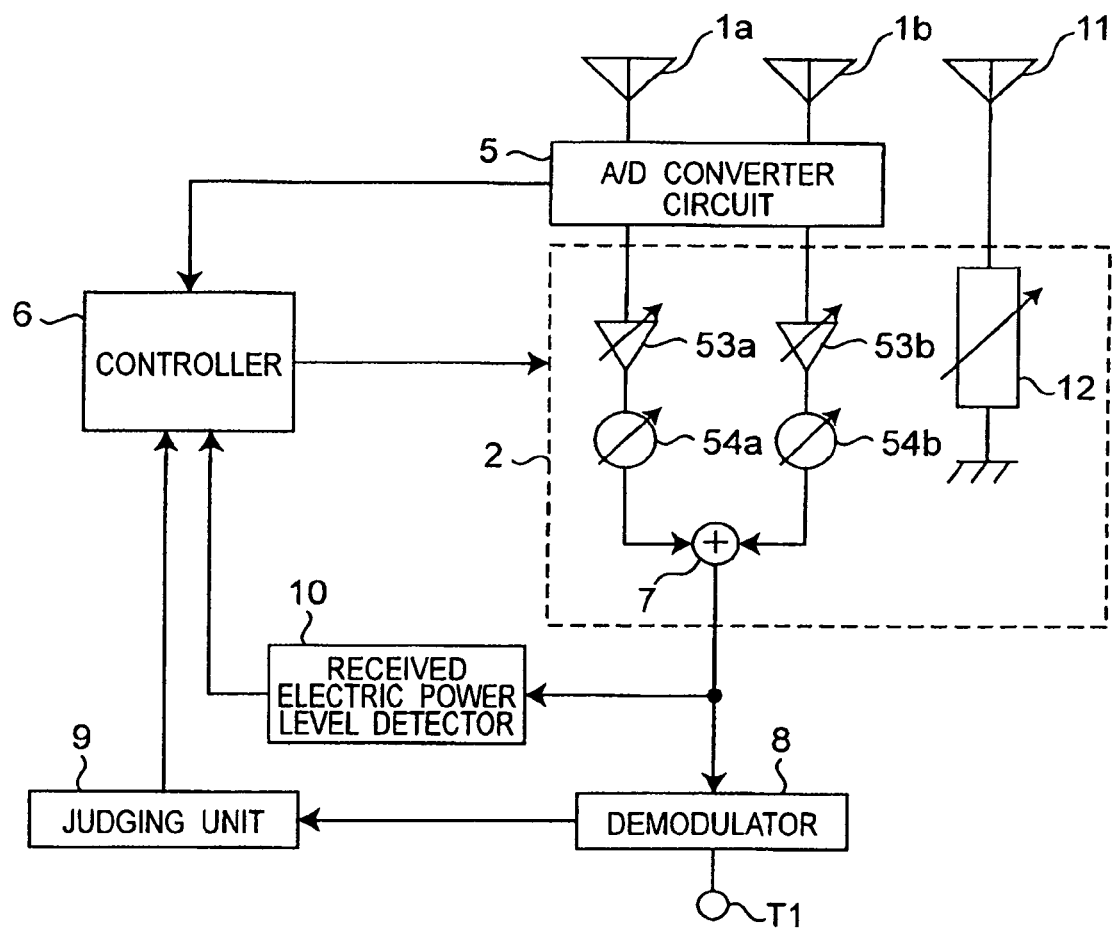
FIG. 21 is a block diagram showing a configuration of an adaptive antenna apparatus according to a tenth embodiment of the present invention.

FIG. 21 is a block diagram showing a configuration of an adaptive antenna apparatus according to a tenth embodiment of the present invention. The tenth embodiment is attained by digitalizing one part of apparatus circuit of the first embodiment, and is different from that of the first embodiment of FIG. 1 at the following points:

an A/D converter circuit 5 is inserted between antenna elements 1a and 1b and a reception adaptive control circuit 2; and variable gain amplifiers 3a and 3b and phase shifters 4a and 4b of the circuits of the reception adaptive control circuit 2 are digitalized to be variable gain amplifiers 53a and 53b and phase shifters 54a and 54b, respectively.

Hereinafter, these different points are described in detail.

Referring to FIG. 21, a radio signal received by the antenna element 1a is subjected to A/D conversion into a digital radio signal by an A/D converter of the A/D converter circuit 5. Then, the digital radio signal is outputted to a controller 6, and is outputted to a signal combiner 7 via the variable gain amplifier 53a and the phase shifter 54a of the reception adaptive control circuit 2. Also, a radio signal received by the antenna element 1b is subjected to A/D conversion into a digital radio signal by the A/D converter of the A/D converter circuit 5. Then, the digital radio signal is outputted to the controller 6, and is outputted to the signal combiner 7 via the variable gain amplifier 53b, and the phase shifter 54b of the reception adaptive control circuit 2.

According to the tenth embodiment configured as described above, the directivity adaptive control can be performed over the digital radio signals digitalized by the A/D converter circuit 5. The received radio signals can be adaptively controlled in a manner similar to that of the first embodiment. For example, respective processes of the variable gain amplifiers 53a and 53b, and the phase shifters 54a and 54b, and the adder 7 may be executed by software of a digital computer. This allows the increasing signal processing and reducing electric power consumption.

Eleventh Embodiment

Figure 22:
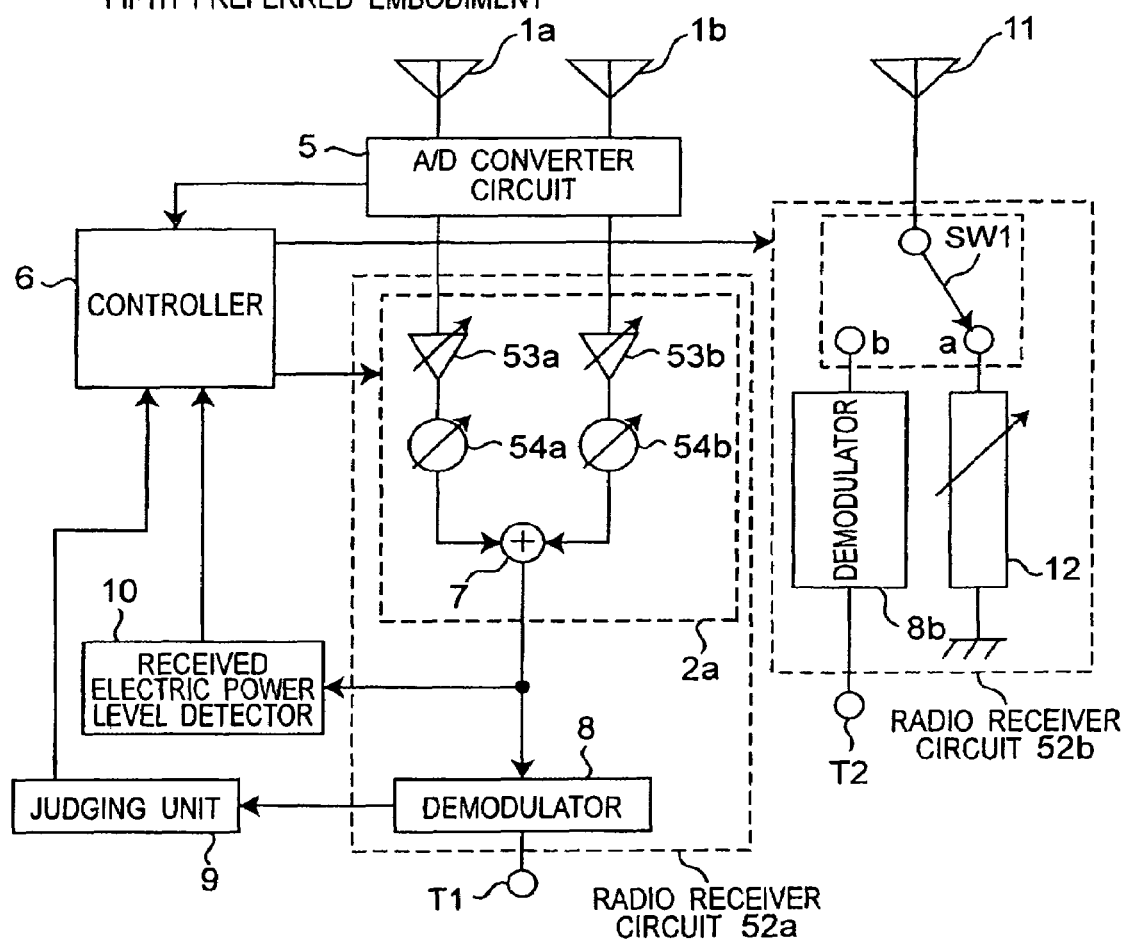
FIG. 22 is a block diagram showing a configuration of an adaptive antenna apparatus according to an eleventh embodiment of the present invention.

FIG. 22 is a block diagram showing a configuration of an adaptive antenna apparatus according to an eleventh embodiment of the present invention. The eleventh embodiment is attained by digitalizing one part of apparatus circuit of the fourth embodiment, and is different from the fourth embodiment of FIG. 7 at the following points:

an A/D converter circuit 5 is inserted between antenna elements 1a and 1b and a reception adaptive control circuit 2; and variable gain amplifiers 3a and 3b and phase shifters 4a and 4b of the circuits of the reception adaptive control circuit 2 are digitalized to be variable gain amplifiers 53a and 53b and phase shifters 54a and 54b, respectively, which configure a reception adaptive control circuit 2a.

Hereinafter, these different points are described in detail.

Referring to FIG. 22, a radio signal received by the antenna element 1a is subjected to A/D conversion into a digital radio signal by an A/D converter of the A/D converter circuit 5. Then, the digital radio signal is outputted to a controller 6, and is outputted to a signal combiner 7 via the variable gain amplifier 53a, and the phase shifter 54a of the reception adaptive control circuit 2a. Also, a radio signal received by the antenna element 1b is subjected to A/D conversion into a digital radio signal by the A/D converter of the A/D converter circuit 5. Then, the digital radio signal is outputted to the controller 6, and is outputted to the signal combiner 7 via the variable gain amplifier 53b and the phase shifter 54b of the reception adaptive control circuit 2a.

According to the eleventh embodiment configured as described above, directivity adaptive control can be performed over the digital radio signals digitalized by the A/D converter circuit 5, and the received radio signals can be adaptively controlled in a manner similar to that of the fourth embodiment. For example, respective processes of the variable gain amplifiers 53a and 53b, and the phase shifters 54a and 54b, and the adder 7 of the circuits of the reception adaptive control circuit 2a may be executed by software of a digital computer. This allows increasing the signal processing and reducing electric power consumption.

Twelfth Embodiment

Figure 23:
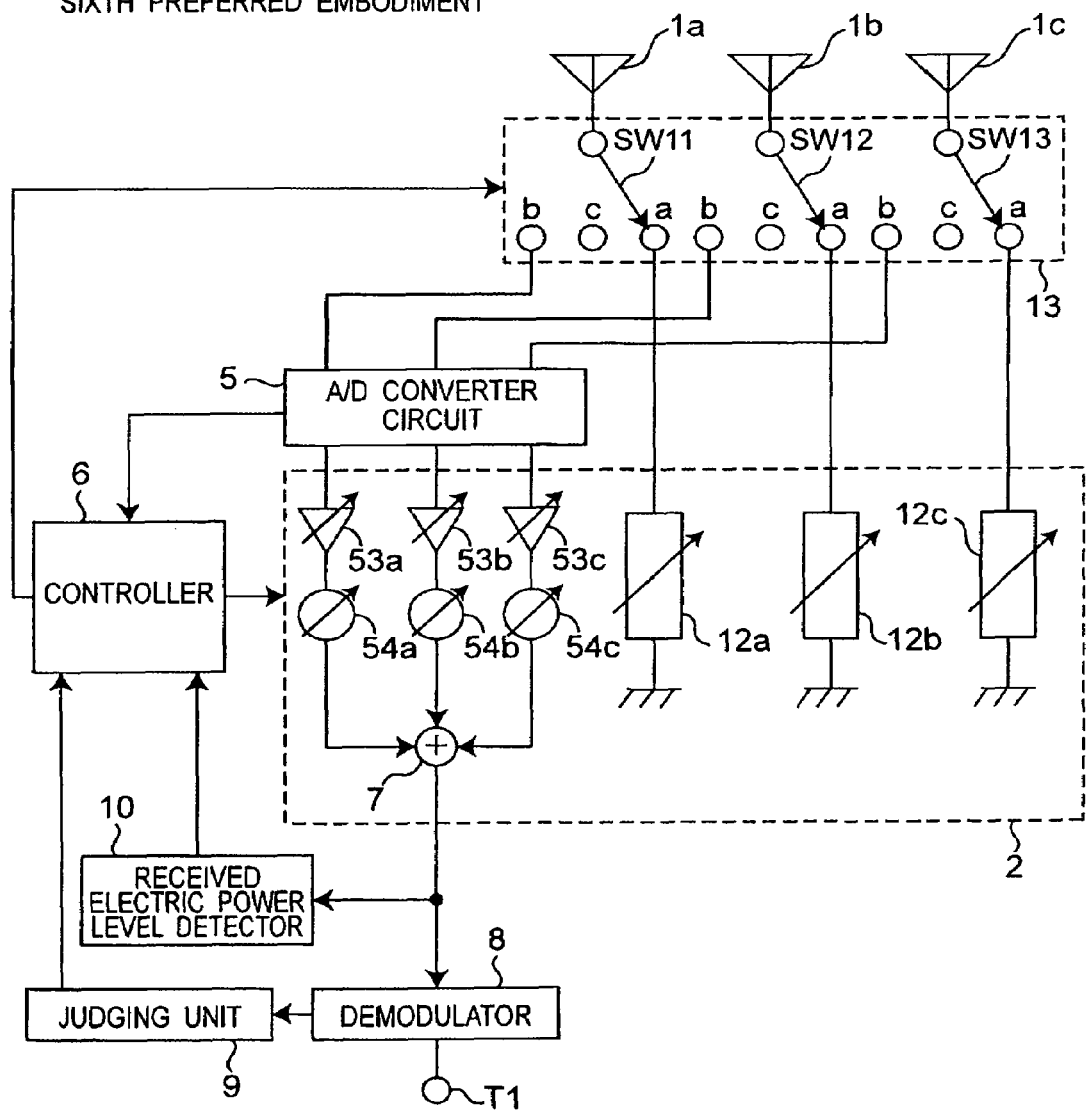
FIG. 23 is a block diagram showing a configuration of an adaptive antenna apparatus according to a twelfth embodiment of the present invention.

FIG. 23 is a block diagram showing a configuration of an adaptive antenna apparatus according to a twelfth embodiment of the present invention. The twelfth embodiment is attained by digitalizing one part of the apparatus circuit of the fifth embodiment, and is different from the fifth embodiment of FIG. 8 at the following points:

an A/D converter circuit 5 is inserted between antenna elements 1a, 1b and 1c, and a reception adaptive control circuit 2; and variable gain amplifiers 3a, 3b and 3c and phase shifters 4a, 4b and 4c of the circuits of the reception adaptive control circuit 2 are digitalized to be variable gain amplifiers 53a, 53b and 53c and the phase shifters 54a, 54b and 54c, respectively.

Hereinafter, these different points are described in detail.

Referring to FIG. 23, a radio signal received by the antenna element 1a is inputted to an A/D converter of the A/D converter circuit 5 via a contact "b" side of a switch SW11, and the relevant A/D converter executes A/D conversion on the inputted radio signal into a digital radio signal. Then, the digital radio signal is outputted to a controller 6, and is outputted to a signal combiner 7 via the variable gain amplifier 53a, and the phase shifter 54a of the reception adaptive control circuit 2a. Also, a radio signal received by the antenna element 1b is inputted to the A/D converter of the A/D converter circuit 5 via a contact "b" side of a switch SW12, and the relevant A/D converter executes A/D conversion on the inputted radio signal into a digital radio signal. Then, the digital radio signal is outputted to the controller 6, and is outputted to the signal combiner 7 via the variable gain amplifier 53b, and the phase shifter 54b of the reception adaptive control circuit 2a. Furthermore, a radio signal received by the antenna element 1c is inputted to the A/D converter of the A/D converter circuit 5 via a contact "b" side of a switch SW13, and the relevant A/D converter executes A/D conversion on the inputted radio signal into a digital radio signal. Then, the digital radio signal is outputted to the controller 6, and is outputted to the signal combiner 7 via the variable gain amplifier 53c, and the phase shifter 54c of the reception adaptive control circuit 2a.

According to the twelfth embodiment configured as described above, directivity adaptive control can be performed over the digital radio signals digitalized by the A/D converter circuit 5, and the received radio signals can be adaptively controlled in a manner similar to that of the fifth embodiment. For example, respective processes of the variable gain amplifiers 53a and 53b, and the phase shifters 54a and 54b, and an adder 7 of the circuits of the reception adaptive control circuit 2a may be executed by software of a digital computer. This allows increasing signal processing and reducing electric power consumption.

ADDITIONAL EMBODIMENTS

Figure 24:
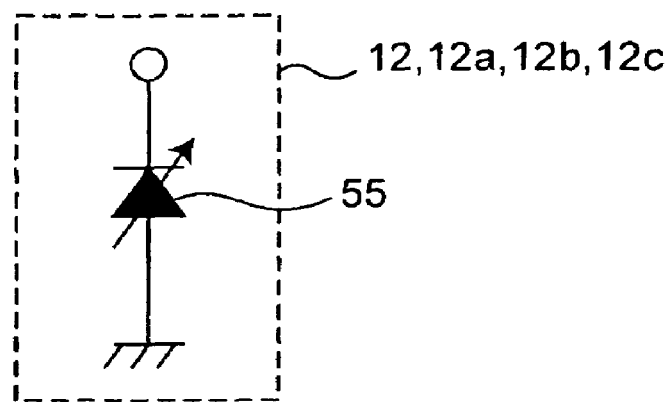
FIG. 24 is a circuit diagram showing variable reactance elements 12, 12a, 12b and 12c each constituted by a variable capacity diode 55 according to a thirteenth embodiment.

FIG. 24 is a circuit diagram showing the variable reactance elements 12, 12a, 12b and 12c constituted by a variable capacity diode 55, according to a thirteenth embodiment. In the previously described embodiments, the variable reactance elements 12, 12a, 12b and 12c are each constituted by the variable capacity diode 55 of FIG. 24, and each reactance value may be changed by changing an applied reverse bias voltage.

Figure 25:
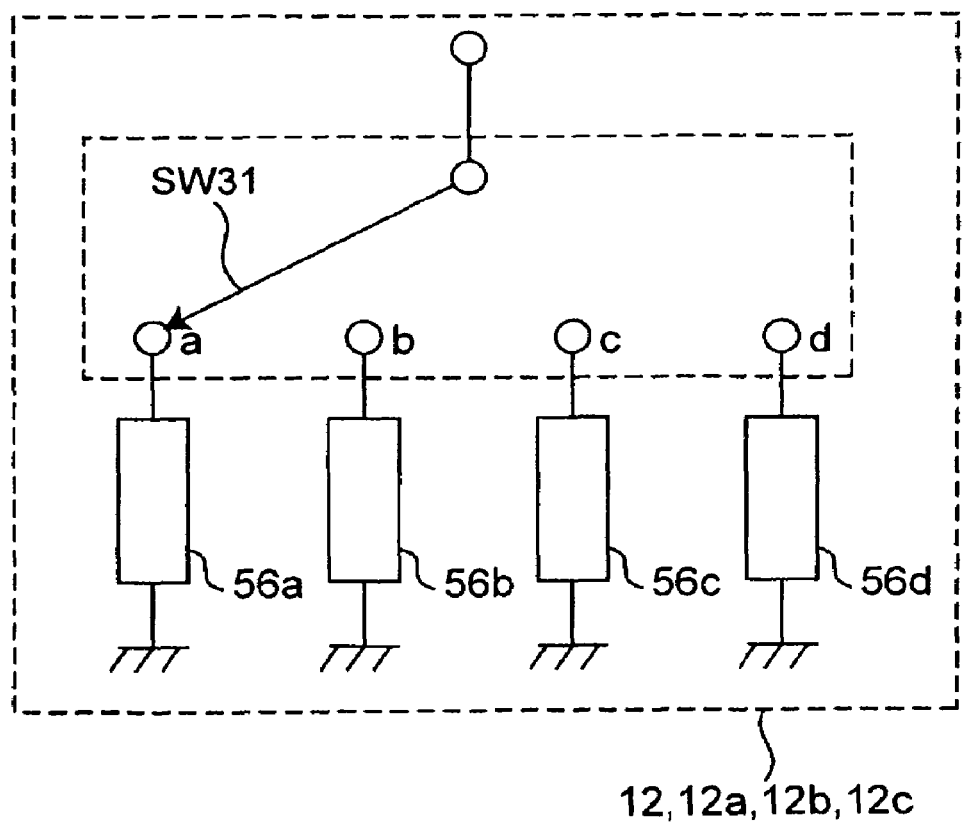
FIG. 25 is a circuit diagram showing variable reactance elements 12, 12a, 12b and 12c each constituted by four reactance elements 56a, 56b, 56c and 56d and a switch SW31 that selectively switches over the reactance elements 56a, 56b, 56c and 56d, according to the thirteenth embodiment.

FIG. 25 is a circuit diagram showing the variable reactance elements 12, 12a, 12b and 12c each constituted by four reactance elements 56a, 56b, 56c and 56d and a switch SW31 that selectively switches over these reactance elements 56a, 56b, 56c and 56d, according to a fourteenth embodiment. In the above-described embodiments, as shown in FIG. 25, the variable reactance elements 12, 12a, 12b and 12c may each be constituted by the four reactance elements 56a, 56b, 56c and 56d and the switch SW31 that selectively switches these reactance elements 56a, 56b, 56c and 56d. In this case, each of the reactance elements 56a, 56b, 56c and 56d is, for example, a passive element such as a capacitor and an inductor having a fixed element value, or an active element such as a variable capacity diode. The number of the reactance elements is not limited to four, but a plurality of variable reactance elements may be employed.

In the above-described embodiments, the signal quality is, for example, a bit error rate BER outputted from the judging unit 9. However, the present invention is not limited to this. A signal level or a signal quality measure such as the received electric power level from the electric power level detector 10 may be used as the signal quality.

According to the adaptive antenna apparatus described herein, and a radio communication apparatus using the antenna apparatus, control is performed such that one adaptive control process of the first adaptive control process and the second adaptive control process is executed. When the detected signal quality is equal to or larger than a predetermined threshold, a predetermined communication process is executed. On the other hand, when the detected signal quality is not equal to or larger than the threshold, the other adaptive control process is executed. Alternatively, the control is performed such that using one part of the plurality of antenna elements, based on the detected signal levels of the received signals, the first adaptive control process is executed. When the detected signal quality is equal to or larger than the predetermined threshold, the predetermined communication process is executed. On the other hand, when the detected signal quality is not equal to or larger than the predetermined threshold, using the antenna element other than the antenna element used by the first adaptive control process, the second adaptive control process is executed. Therefore, for example, even in a relatively low frequency band used in a mobile radio system, interference waves can be suppressed with a smaller number of antenna elements and a radio signal having the best signal quality can always be received.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. An adaptive antenna apparatus comprising:
a plurality of antenna elements;
a variable reactance element;
at least one parasitic element connected to the variable reactance element;
an adaptive controller for executing a first adaptive control process for adaptively controlling respective received signals received by the plurality of antenna elements, and outputting the respective received signals, after the first adaptive control process, as a combined received signal;
a reactance controller for executing a second adaptive control process for reactance controlling an element value of the variable reactance element;
a signal quality detector for detecting signal quality of the combined received signal; and
an apparatus controller for executing one of the first and second adaptive control processes executing a predetermined communication process when a detected signal quality is equal to or larger than a predetermined threshold, and executing the other of the first and second adaptive control processes when the detected signal quality is not equal to or larger than the threshold.

2. The adaptive antenna apparatus as claimed in claim 1, further comprising a receiver for separating the variable reactance element from the parasitic element and receiving a signal received by the parasitic element when no radio signal is received by the plurality of antenna elements.

3. The adaptive antenna apparatus as claimed in claim 1, wherein the apparatus controller is configured to execute the first adaptive control process and the communication process when the detected signal quality is equal to or larger than the predetermined threshold, and the apparatus controller is configured to execute the second adaptive control process when the detected signal quality is not equal to or larger than the predetermined threshold.

4. The adaptive antenna apparatus as claimed in claim 2, wherein the apparatus controller is configured to execute the first adaptive control process and the communication process when the detected signal quality is equal to or larger than the predetermined threshold, and the apparatus controller is configured to execute the second adaptive control process when the detected signal quality is not equal to or larger than the predetermined threshold.

5. The adaptive antenna apparatus as claimed in claim 1, wherein the apparatus controller is configured to execute the second adaptive control process and the communication process when the detected signal quality is equal to or larger than the predetermined threshold, and the apparatus controller is configured to execute the first adaptive control process when the detected signal quality is not equal to or larger than the predetermined threshold.

6. The adaptive antenna apparatus as claimed in claim 2, wherein the apparatus controller is configured to execute the second adaptive control process and the communication process when the detected signal quality is equal to or larger than the predetermined threshold, and the apparatus controller is configured to execute the first adaptive control process when the detected signal quality is not equal to or larger than the predetermined threshold.

7. The adaptive antenna apparatus as claimed in claim 1, wherein the second adaptive control process includes plural adaptive control processes using a plurality of adaptive control methods different from each other, and wherein the apparatus controller is configured to select and execute one of the plural adaptive control processes included in the second adaptive control process based on a maximum received electric power of each of the respective received signals received by the antenna elements.

8. The adaptive antenna apparatus as claimed in claim 2, wherein the second adaptive control process includes plural adaptive control processes using a plurality of adaptive control methods different from each other, and wherein the apparatus controller is configured to select and execute one of the plural adaptive control processes included in the second adaptive control process based on a maximum received electric power of each of the respective received signals received by the antenna elements.

9. The adaptive antenna apparatus as claimed in claim 7, wherein the second adaptive control process includes:

using a first adaptive control method of controlling the element value of the variable reactance element so that an estimation function including a signal-to-noise ratio becomes a maximum or minimum;

using a second adaptive control method of controlling the element value of the variable reactance element so that an estimation function including a bit error rate becomes a maximum or minimum; and using a third adaptive control method of controlling the element value of the variable reactance element so that an estimation function including the signal-to-noise ratio and the bit error rate becomes a maximum or minimum, wherein the apparatus controller is configured to execute the second adaptive control process using the first adaptive control method when the maximum received electric power is smaller than a predetermined first threshold, wherein the apparatus controller is configured to execute the second adaptive control process using the second adaptive control method when the maximum received electric power is equal to or larger than the first threshold and is smaller than a predetermined second threshold that is larger than the first threshold, and wherein the apparatus controller is configured to execute the second adaptive control process using the third adaptive control method when the maximum received electric power is equal to or larger than the second threshold.

10. The adaptive antenna apparatus as claimed in claim 8, wherein the second adaptive control process includes:

using a first adaptive control method of controlling the element value of the variable reactance element so that an estimation function including a signal-to-noise ratio becomes a maximum or minimum;

using a second adaptive control method of controlling the element value of the variable reactance element so that an estimation function including a bit error rate becomes a maximum or minimum; and using a third adaptive control method of controlling the element value of the variable reactance element so that an estimation function including the signal-to-noise ratio and the bit error rate becomes a maximum or minimum, wherein the apparatus controller is configured to execute the second adaptive control process using the first adaptive control method when the maximum received electric power is smaller than a predetermined first threshold, wherein the apparatus controller is configured to execute the second adaptive control process using the second adaptive control method when the maximum received electric power is equal to or larger than the first threshold and is smaller than a predetermined second threshold that is larger than the first threshold, and wherein the apparatus controller is configured to execute the second adaptive control process using the third adaptive control method when the maximum received electric power is equal to or larger than the second threshold.

11. An adaptive antenna apparatus comprising:

a plurality of antenna elements;

a plurality of variable reactance elements provided so as to correspond to at least one of the antenna elements;

a plurality of reception adaptive controllers provided so as to correspond to at least one of the antenna elements;

a switching device for switching the antenna elements so as to selectively connect each of the antenna elements to one of the corresponding variable reactance element and the corresponding reception adaptive controller;

an adaptive controller for executing a first adaptive control process for adaptively controlling respective received signals received by at least one of the antenna elements via the switching device, and outputting the respective received signals after the first adaptive control process as a combined received signal;

a reactance controller for executing a second adaptive control process for reactance controlling element values of the respective reactance elements connected to at least one of the antenna elements via the switching device;

a signal quality detector for detecting a signal quality of the combined received signal;

a signal level detector for detecting signal levels of the respective received signals received by the antenna elements; and an apparatus controller for executing the first adaptive control process using one of the antenna elements based on the detected signal levels of the respective received signals, executing a predetermined communication process when a detected signal quality is equal to or larger than a predetermined threshold, and executing the second adaptive control process using one of the antenna elements different than the antenna element used by the first adaptive control process when the detected signal quality is not equal to or larger than the predetermined threshold.

12. The adaptive antenna apparatus as claimed in claim 11, wherein, at a first step, the apparatus controller causes the signal quality detector to detect signal quality of a received signal having a maximum signal level from among the detected signal levels of the respective received signals, and the apparatus controller executes the communication process when the detected signal quality is equal to or larger than the threshold, and at a second step, when the detected signal quality is not equal to or larger than the threshold, the apparatus controller causes the signal quality detector to detect signal quality of a combined received signal of the received signal having the maximum signal level and the received signal having the second-largest signal level among the detected signal levels of the respective received signals, and the apparatus controller executes the communication process when the detected signal quality is equal to or larger than the threshold.

13. The adaptive antenna apparatus as claimed in claim 12,
wherein, prior to the processing of the second step, the apparatus controller executes the second adaptive control process with the reactance controller using at least one of the antenna elements different than the antenna element that received the received signal having the maximum signal level, the apparatus controller executes the communication process when the detected signal quality is equal to or larger than the threshold, and the apparatus controller executes the process of the second step when the detected signal quality is not equal to or larger than the threshold.

14. The adaptive antenna apparatus as claimed in claim 11,
wherein,
at a first step, the apparatus controller causes the signal quality detector to detect signal quality of a received signal having the maximum signal quality from among the detected signal qualities of the respective received signals, the apparatus controller executes the communication process when the detected signal quality is equal to or larger than the threshold, and at a second step, when the detected signal quality is not equal to or larger than the threshold, the apparatus controller causes the signal quality detector to detect signal quality of a combined received signal of the received signal having the maximum signal quality and the received signal having the second-largest signal quality from among the detected signal qualities of the respective received signals, and the apparatus controller executes the communication process when the detected signal quality is equal to or larger than the threshold.

15. The adaptive antenna apparatus as claimed in claim 14,
wherein, prior to the processing of the second step, the apparatus controller executes the second adaptive control process with the reactance controller using at least one of the antenna elements different than the antenna element that has received the received signal having the maximum signal quality, and the apparatus controller executes the communication process when the detected signal quality is equal to or larger than the threshold, and the apparatus controller executes the process of the second step when the detected signal quality is not equal to or larger than the threshold.

16. The adaptive antenna apparatus as claimed in claim 12,
wherein, at a third step after the processing of the second step, the apparatus controller executes the second adaptive control process with the reactance controller using at least one remaining antenna element with which the second adaptive control process has not been executed, different than the antenna element that received the received signal having the maximum signal quality, and the apparatus controller executes the communication process when the detected signal quality is equal to or larger than the threshold.

17. The adaptive antenna apparatus as claimed in claim 13,
wherein, at a third step after the processing of the second step, the apparatus controller executes the second adaptive control process with the reactance controller using at least one remaining antenna element with which the second adaptive control process has not been executed, different than the antenna element that received the signal having the maximum signal quality, and the apparatus controller executes the communication process when the detected signal quality is equal to or larger than the threshold.

18. The adaptive antenna apparatus as claimed in claim 16,
wherein, after the processing of the third step, the apparatus controller executes the first adaptive control process using the plurality of antenna elements connected to the plurality of adaptive controllers when the signal quality detected at the third step is not equal to or larger than the threshold.

19. The adaptive antenna apparatus as claimed in claim 17,
wherein, after the processing of the third step, the apparatus controller executes the first adaptive control process using the plurality of antenna elements connected to the plurality of adaptive controllers when the signal quality detected at the third step is not equal to or larger than the threshold.

20. A radio communication apparatus comprising:
an adaptive antenna apparatus; and
a radio receiver circuit that receives a received signal received by the adaptive antenna apparatus,
wherein the adaptive antenna apparatus comprises:
a plurality of antenna elements;
a variable reactance element;
at least one parasitic element connected to the variable reactance element;
an adaptive controller for executing a first adaptive control process for adaptively controlling respective received signals received by the plurality of antenna elements, and outputting the respective received signals after the first adaptive control process as a combined received signal;
a reactance controller for executing a second adaptive control process for reactance controlling an element value of the variable reactance element;
a signal quality detector for detecting signal quality of the combined received signal; and
an apparatus controller for executing one of the first and second adaptive control processes, executing a predetermined communication process when a detected signal quality is equal to or larger than a predetermined threshold, and executing the other of the first and second adaptive control processes when the detected signal quality is not equal to or larger than the threshold.

21. A radio communication apparatus comprising:
an adaptive antenna apparatus; and
a radio receiver circuit that receives a received signal received by the adaptive antenna apparatus,
wherein the adaptive antenna apparatus comprises:
a plurality of antenna elements;
a plurality of variable reactance elements provided so as to correspond to at least one of the antenna elements;
a plurality of reception adaptive controllers provided so as to correspond to at least one of the antenna elements;
a switching device for switching over the antenna elements so as to selectively connect each of the antenna elements to one of the corresponding variable reactance element and the corresponding reception adaptive controller;
an adaptive controller for executing a first adaptive control process for adaptively controlling respective received signals received by at least one of the antenna elements via the switching device, and outputting the respective received signals after the first adaptive control process as a combined received signal;

a reactance controller for executing a second adaptive control process for reactance controlling element values of the respective reactance elements connected to at least one of the antenna elements via the switching device;

a signal quality detector for detecting signal quality of the combined received signal;

a signal level detector for detecting signal levels of the respective received signals received by the antenna elements; and an apparatus controller for executing the first adaptive control process using one of the antenna elements based on the detected signal levels of the respective received signals, executing a predetermined communication process when a detected signal quality is equal to or larger than a predetermined threshold, and executing the second adaptive control process using one of the antenna elements different than the antenna element used by the first adaptive control process when the detected signal quality is not equal to or larger than the predetermined threshold.

* * * * *

UNITED STATES PATENT AND TRADEMARK OFFICE
CERTIFICATE OF CORRECTION

PATENT NO.        : 7,324,047 B2
APPLICATION NO. : 11/401267
DATED             : January 29, 2008
INVENTOR(S)       : Atsushi Yamamoto et al.

Page 1 of 1

It is certified that error appears in the above-identified patent and that said Letters Patent is hereby corrected as shown below:

On the title page, item [53] and column 1, line 3:

The Title has been corrected from "ADAPTIVE ANTENNA APPARATUS FOR SELECTING ADAPTIVE CONTROL PROCESSING ACCORDING TO DETECTED SIGNAL QUALITY AND RADIO COMMUNICATION APPARATUS USING THE SAME" to -- ADAPTIVE ANTENNA APPARATUS FOR SELECTING ADAPTIVE CONTROL ~~PROCESSING~~ <u>PROCESS</u> ACORDING TO DETECTED SIGNAL QUALITY AND RADIO COMMUNICATION APPARATUS USING THE SAME --.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,324,047 B2 |
| APPLICATION NO. | : 11/401267 |
| DATED | : January 29, 2008 |
| INVENTOR(S) | : Atsushi Yamamoto et al. |

Page 1 of 1

It is certified that error appears in the above-identified patent and that said Letters Patent is hereby corrected as shown below:

On the title page, item [54] and column 1, line 3:

The Title has been corrected from "ADAPTIVE ANTENNA APPARATUS FOR SELECTING ADAPTIVE CONTROL PROCESSING ACCORDING TO DETECTED SIGNAL QUALITY AND RADIO COMMUNICATION APPARATUS USING THE SAME" to -- ADAPTIVE ANTENNA APPARATUS FOR SELECTING ADAPTIVE CONTROL ~~PROCESSING~~ PROCESS ACORDING TO DETECTED SIGNAL QUALITY AND RADIO COMMUNICATION APPARATUS USING THE SAME --.

This certificate supersedes the Certificate of Correction issued July 1, 2008.

Signed and Sealed this

Twenty-second Day of July, 2008

JON W. DUDAS
*Director of the United States Patent and Trademark Office*